US011623633B2

(12) United States Patent
Vaughn et al.

(10) Patent No.: US 11,623,633 B2
(45) Date of Patent: Apr. 11, 2023

(54) METHODS AND SYSTEMS FOR A TWO-SPEED ACCESSORY DRIVE OF AN ENGINE

(71) Applicant: Ford Global Technologies, LLC, Dearborn, MI (US)

(72) Inventors: Timothy Vaughn, Woodhaven, MI (US); David Ord, Woodhaven, MI (US); George Papaioannou, Livonia, MI (US); Joseph Lyle Thomas, Farmington Hills, MI (US); John Brevick, Livonia, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 178 days.

(21) Appl. No.: 17/147,156

(22) Filed: Jan. 12, 2021

(65) Prior Publication Data
US 2022/0219670 A1 Jul. 14, 2022

(51) Int. Cl.
*B60W 10/08* (2006.01)
*B60W 20/13* (2016.01)
*B60W 10/02* (2006.01)
*B60W 10/115* (2012.01)
*B60W 10/06* (2006.01)
*B60W 20/40* (2016.01)
*B60W 20/30* (2016.01)

(52) U.S. Cl.
CPC ............ *B60W 20/13* (2016.01); *B60W 10/02* (2013.01); *B60W 10/06* (2013.01); *B60W 10/08* (2013.01); *B60W 10/115* (2013.01); *B60W 20/30* (2013.01); *B60W 20/40* (2013.01); *B60W 2510/305* (2013.01); *B60W 2710/081* (2013.01); *B60W 2710/1005* (2013.01); *F16H 2200/0034* (2013.01); *F16H 2200/2005* (2013.01); *F16H 2200/2007* (2013.01); *F16H 2200/2082* (2013.01)

(58) Field of Classification Search
CPC ...... B60W 20/13; B60W 10/02; B60W 10/06; B60W 10/08; B60W 10/115; B60W 20/30; B60W 20/40; B60W 2510/3058; B60W 2710/081; B60W 2710/1005; B60W 30/19; B60W 10/30; F16H 2200/2005; F16H 2200/2082; F16H 2061/0422
USPC .......................................... 180/53.8; 477/3, 5
See application file for complete search history.

(56) References Cited

U.S. PATENT DOCUMENTS

| 4,878,401 | A | * | 11/1989 | Chung | ...................... | F16H 3/56 475/312 |
| 6,852,063 | B2 | * | 2/2005 | Takahashi | .............. | B60W 20/11 475/5 |

(Continued)

*Primary Examiner* — Roger L Pang
(74) *Attorney, Agent, or Firm* — Vincent Mastrogiacomo; McCoy Russell LLP

(57) ABSTRACT

Methods and systems are provided for engaging and disengaging an electromagnetic clutch of a two-speed accessory drive of an engine of a vehicle. In one example, a method comprises, responsive to an electrical demand being higher than a threshold electrical demand, operating an electric machine of the vehicle in a motor mode to reduce a speed of a grounding gear of a planetary gear set of a two-speed accessory drive (TSAD) of the vehicle; and engaging an electromagnetic clutch responsive to the speed of the grounding gear reaching a clutch engagement threshold speed.

16 Claims, 9 Drawing Sheets

(56) References Cited

U.S. PATENT DOCUMENTS

| | | | |
|---|---|---|---|
| 6,878,094 B2* | 4/2005 | Kitamura | F02N 15/046 475/5 |
| 6,910,453 B2* | 6/2005 | Sugino | H02K 7/003 290/31 |
| 7,028,794 B2* | 4/2006 | Odahara | B60W 10/30 475/5 |
| 7,114,585 B2 | 10/2006 | Man et al. | |
| 7,524,263 B2* | 4/2009 | Johnson | F02D 29/04 477/3 |
| 8,500,590 B2 | 8/2013 | Showalter | |
| 2018/0162380 A1 | 6/2018 | Colavincenzo et al. | |
| 2019/0301573 A1* | 10/2019 | Hrusch | F16H 9/26 |

* cited by examiner

METHODS AND SYSTEMS FOR A TWO-SPEED ACCESSORY DRIVE OF AN ENGINE

FIELD

The present application relates generally to systems and methods for a two-speed accessory drive of an internal combustion engine.

SUMMARY/BACKGROUND

Front end accessory devices of a vehicle such as an alternator, air conditioner compressor, power steering pump, water pump, etc., may be mounted on the front of an engine of the vehicle. Each front end accessory device may include a front end accessory drive (FEAD) that powers the front end accessory device. A drive pulley may be coupled to a crankshaft of the engine and further coupled to the FEADs of the front end accessory devices through a drive belt and auxiliary pulleys, forming a system that provides power to the front end accessory devices via the crankshaft. Powering of the FEADs via the drive pulley represents a parasitic loss, whereby an efficiency of the engine is reduced and a fuel consumption of the vehicle is increased. Further, efficiency losses may be greater as engine speeds increase. For example, as engine speed increases and an amount of energy transferred by the drive pulley to the FEADs increases, a performance of the corresponding front end accessory devices may remain constant, and therefore the increase in transferred energy may be wasted. Alternatively, as engine speed decreases and an amount of energy transferred by the drive pulley to the FEADs decreases, a performance of the corresponding front end accessory devices may be negatively impacted, whereby there is an increased electrical demand. Further, an electrical demand of other devices of the vehicle may increase or decrease as a function of drive belt speed, for example, if power is supplied to the other devices by an electric machine (e.g., an alternator) coupled to the drive belt.

A current solution to managing increasing or decreasing demands for power includes adjusting a speed of the drive belt via a torque transfer device with at least two rpm ratios (e.g., a two-speed accessory drive or TSAD), for example, as taught by Man et al. in U.S. Pat. No. 7,114,585, which may enable one or more electrical devices to run at higher speeds than an engine speed. In a first operational mode of the TSAD, an electromagnetic clutch is disengaged, and crankshaft torque is transmitted through a one-way clutch to a ring gear/pulley coupled to the crankshaft at a 1:1 ratio. In a second (e.g., enhanced charge) operational mode of the TSAD, the electromagnetic clutch is engaged, and the crankshaft torque is transmitted to the ring gear/pulley through a planetary gear set that drives the TSAD at a higher gear ratio for increased electrical generation.

However, the inventors herein have recognized a problem with this solution, where an engagement and disengagement of the electromagnetic clutch may generate disturbances in driveline torque. Driveline torque disturbances may result in an increased noise, vibration, and harshness (NVH), negatively impacting vehicle performance and a driving experience of a driver of the vehicle. Additionally, inefficiencies in the engagement and disengagement of the electromagnetic clutch may increase a wear of the clutch and other associated parts of the vehicle, whereby a useful life of the clutch and other associated parts may be reduced, and a cost of maintaining the TSAD may be increased.

In one example, the issue described above may be addressed by a method for a vehicle, comprising, responsive to an electrical demand being higher than a threshold electrical demand, operating an electric machine of the vehicle in a motor mode to reduce a speed of a grounding gear of a planetary gear set of the two-speed accessory drive (TSAD) of the vehicle; and engaging an electromagnetic clutch responsive to the speed of the grounding gear reaching a clutch engagement threshold speed. Further, responsive to the electrical demand decreasing below the threshold electrical demand, the electromagnetic clutch may be disengaged, and the electric machine in a motor mode may increase the speed of the grounding gear of the planetary gear set of the TSAD until the speed of the grounding gear reaches a crankshaft speed. In this way, the engagement and disengagement of the electromagnetic clutch may be carried out more efficiently, and an NVH of the vehicle due to driveline torque disturbances may be reduced.

For example, a sun gear of the planetary gear set may be the grounding gear, a ring gear of the planetary gear set may be an output gear, and a carrier to which a plurality of planet gears is coupled may be an input gear (e.g., coupled to a crankshaft of an engine of the vehicle). During the first operational mode, the ring gear, the sun gear, and the carrier may rotate at a speed of the crankshaft (e.g., where no gear is grounded). When the vehicle shifts into an overdrive gear of a transmission of the vehicle, a speed of the engine may decrease, reducing a power available to the FEADs. In response to a request for increased power generation, an electric machine (e.g., a belt-integrated starter generator) may increase a speed of the ring gear from a speed of a crankshaft to a target speed (e.g., a desired speed of a drive belt coupled to the ring gear). By maintaining the carrier at the speed of the crankshaft, a speed of a sun gear is consequently reduced to the clutch engagement threshold speed. When the speed of the sun gear is the clutch engagement threshold speed, the electromagnetic clutch is engaged, thereby switching from the first operational mode to the second operational mode. After engagement, the speed of the ring gear is maintained by the crankshaft and planetary gear set. In response to the electrical demand decreasing below the threshold electrical demand, the electromagnetic clutch is disengaged, and the electric machine reduces the speed of the ring gear until the speed of the ring gear is equal to the speed of the crankshaft. By reducing the speed of the grounding gear to the clutch engagement threshold speed when engaging the electromagnetic clutch and matching the speed of the output gear and the input gear when disengaging the electromagnetic clutch, driveline torque disturbances may be reduced, resulting in a reduced NVH and a smoother driving experience.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
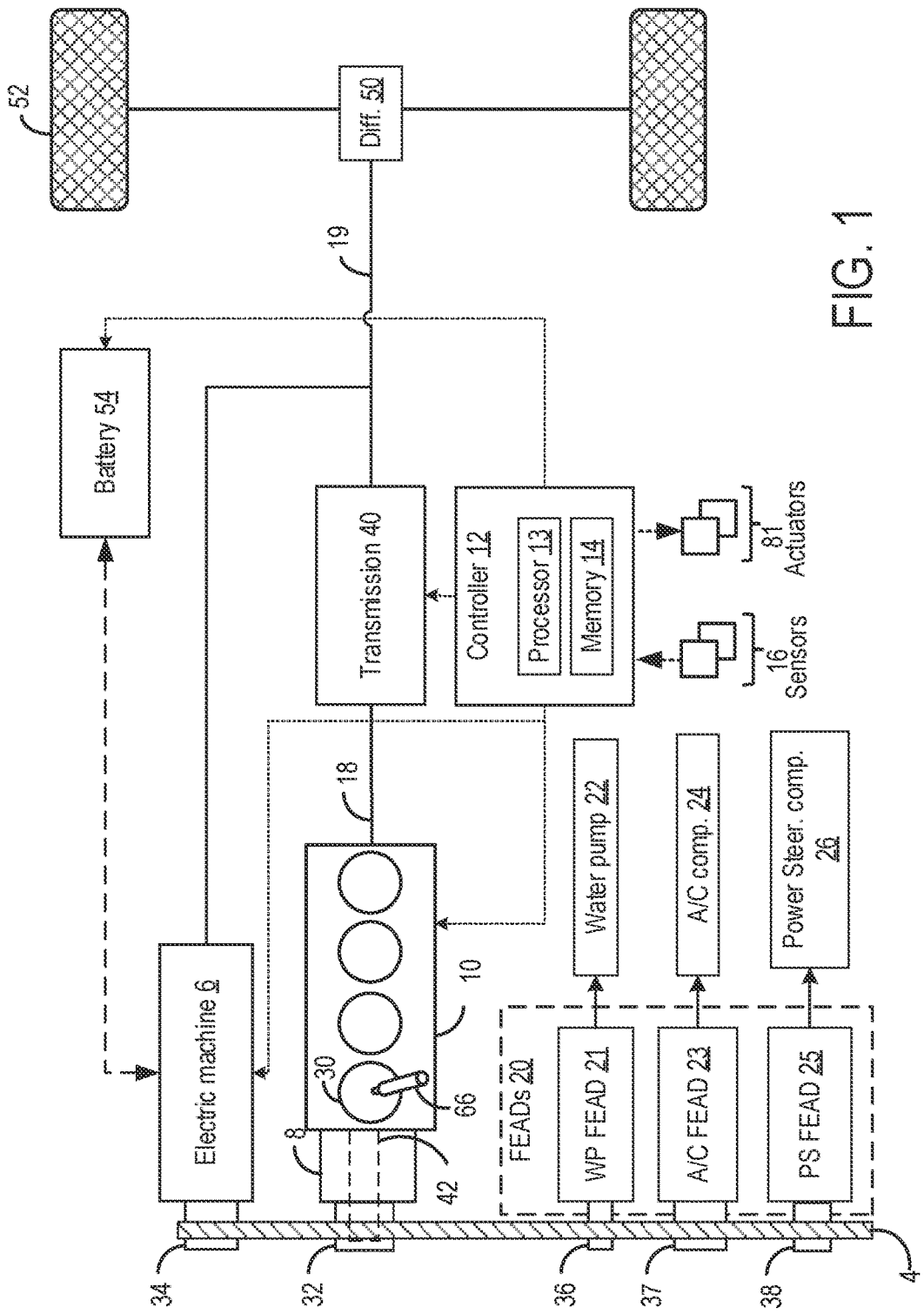
FIG. 1 illustrates an example propulsion system for a hybrid electric vehicle.
Figure 2:
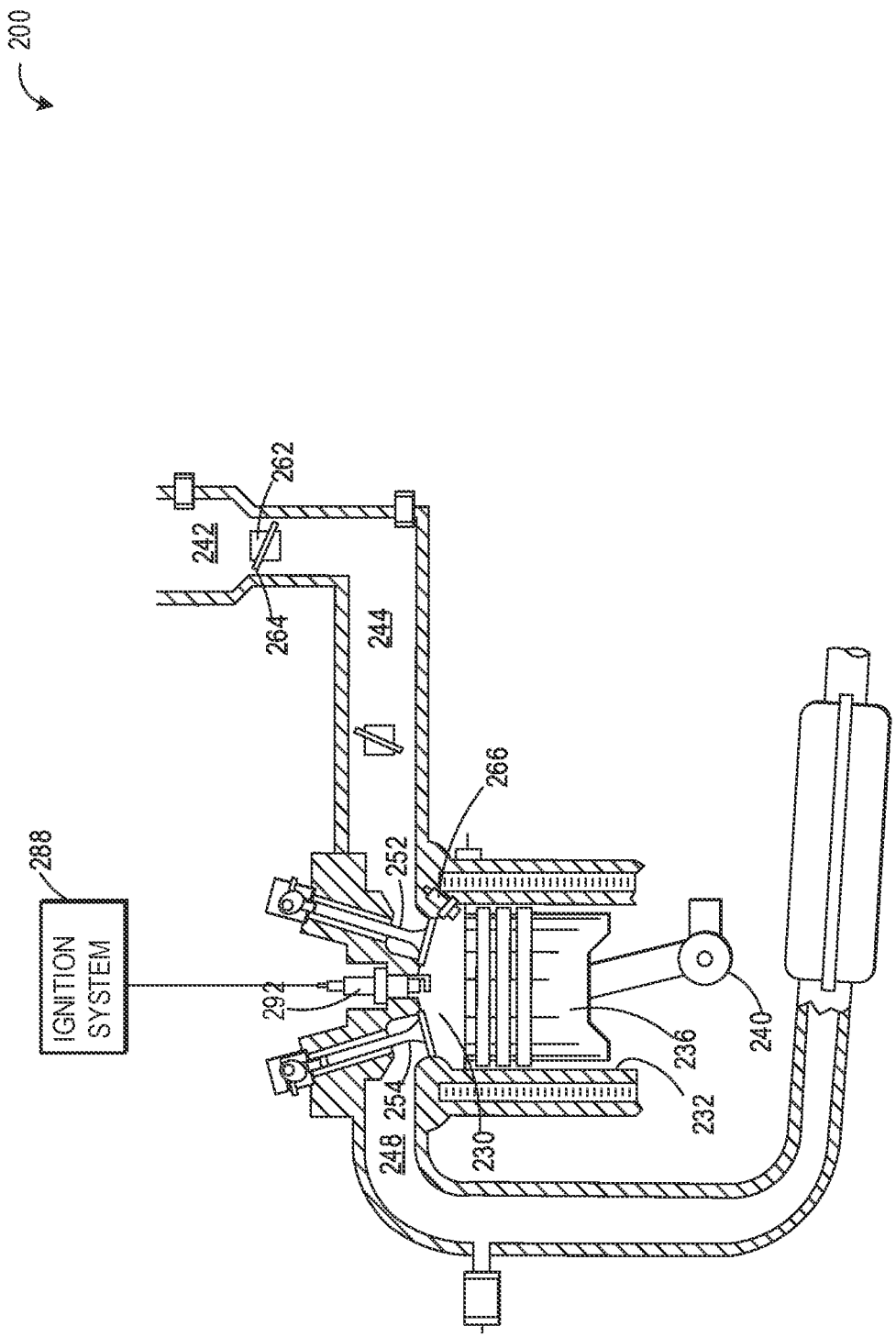
FIG. 2 shows a schematic diagram of an example internal combustion engine.
Figure 3:
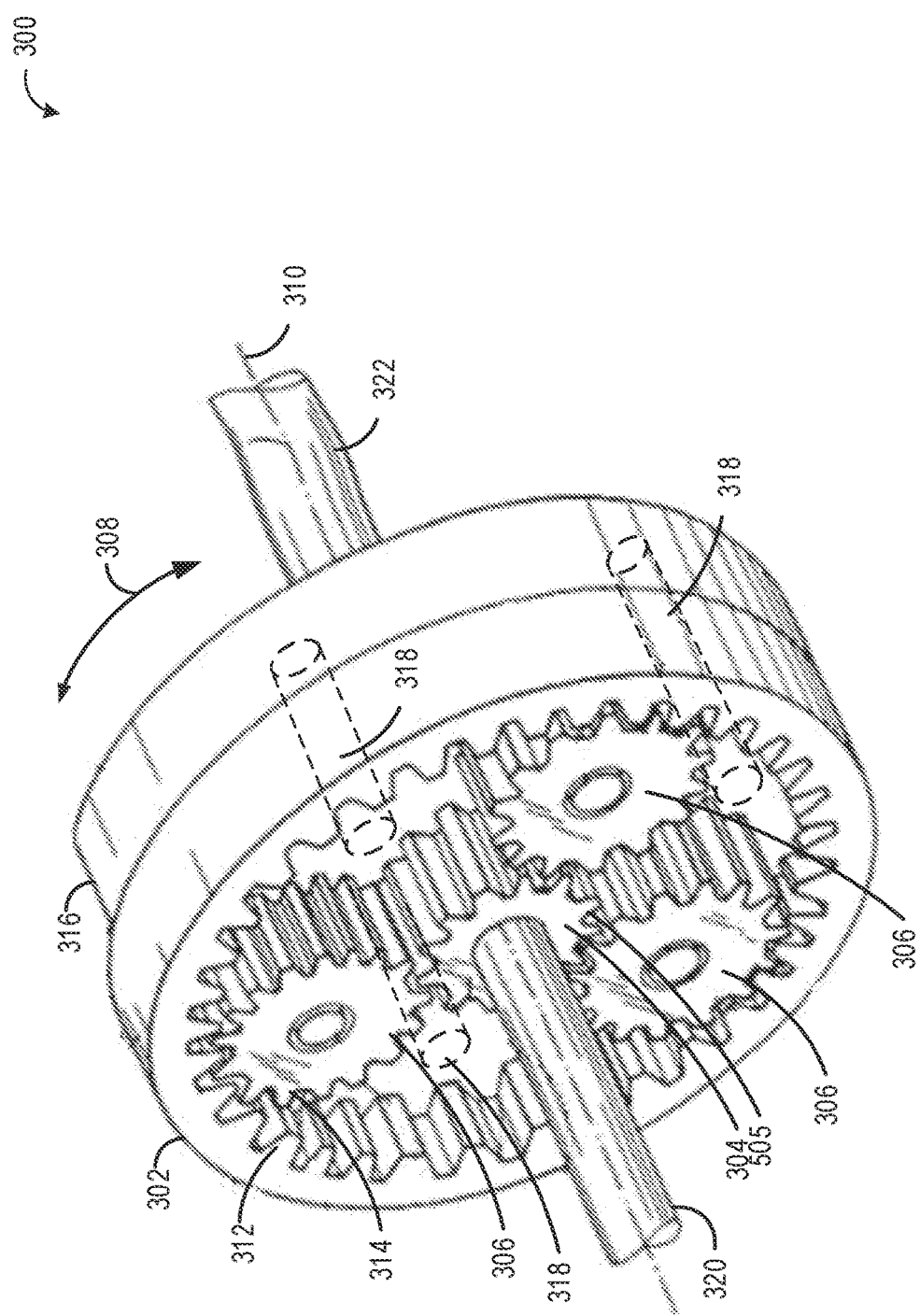
FIG. 3 shows an example planetary gear set.
Figure 4:
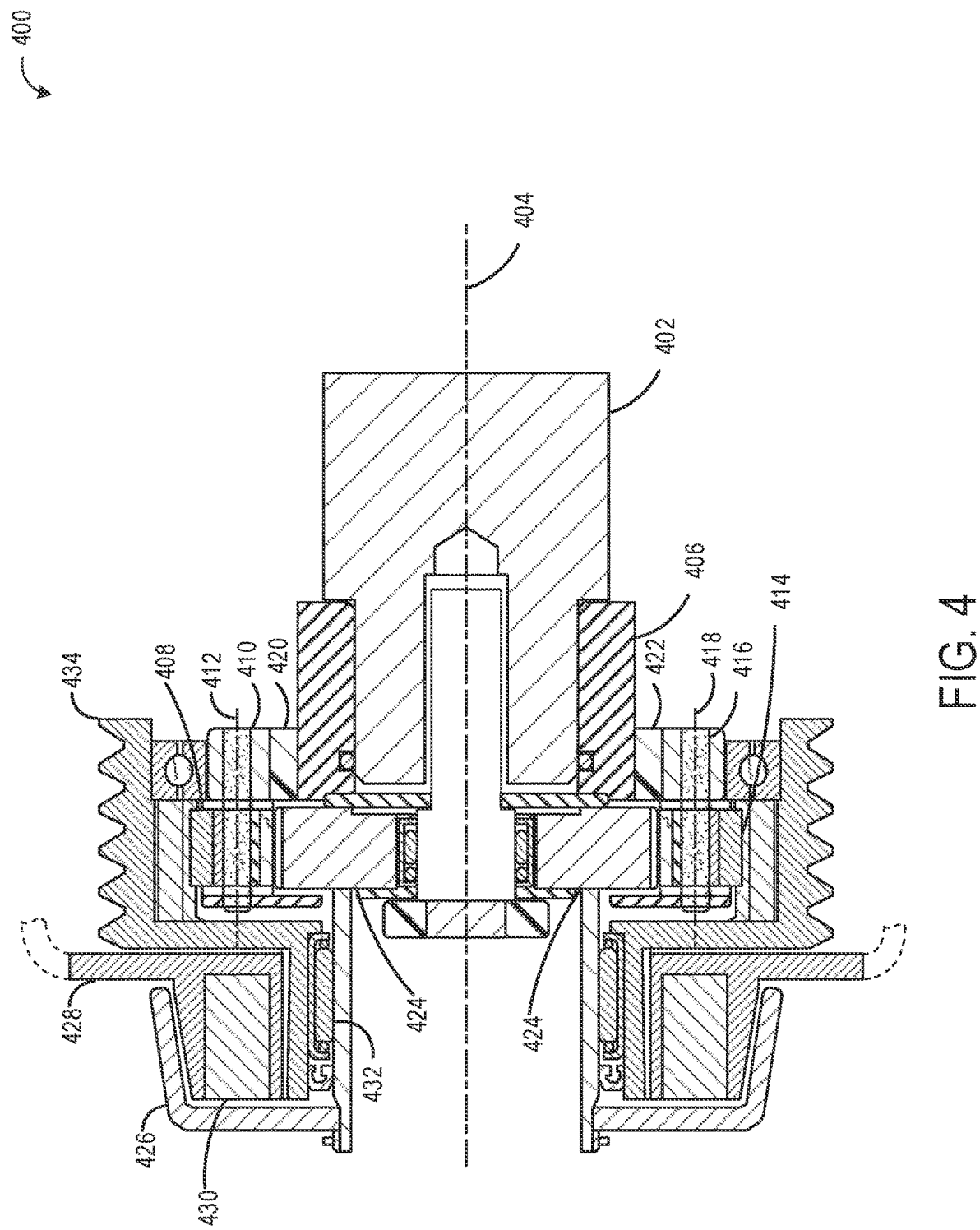
FIG. 4 shows a schematic diagram of an example two speed accessory drive (TSAD) for driving one or more front end accessory devices of the vehicle.
Figure 5A:
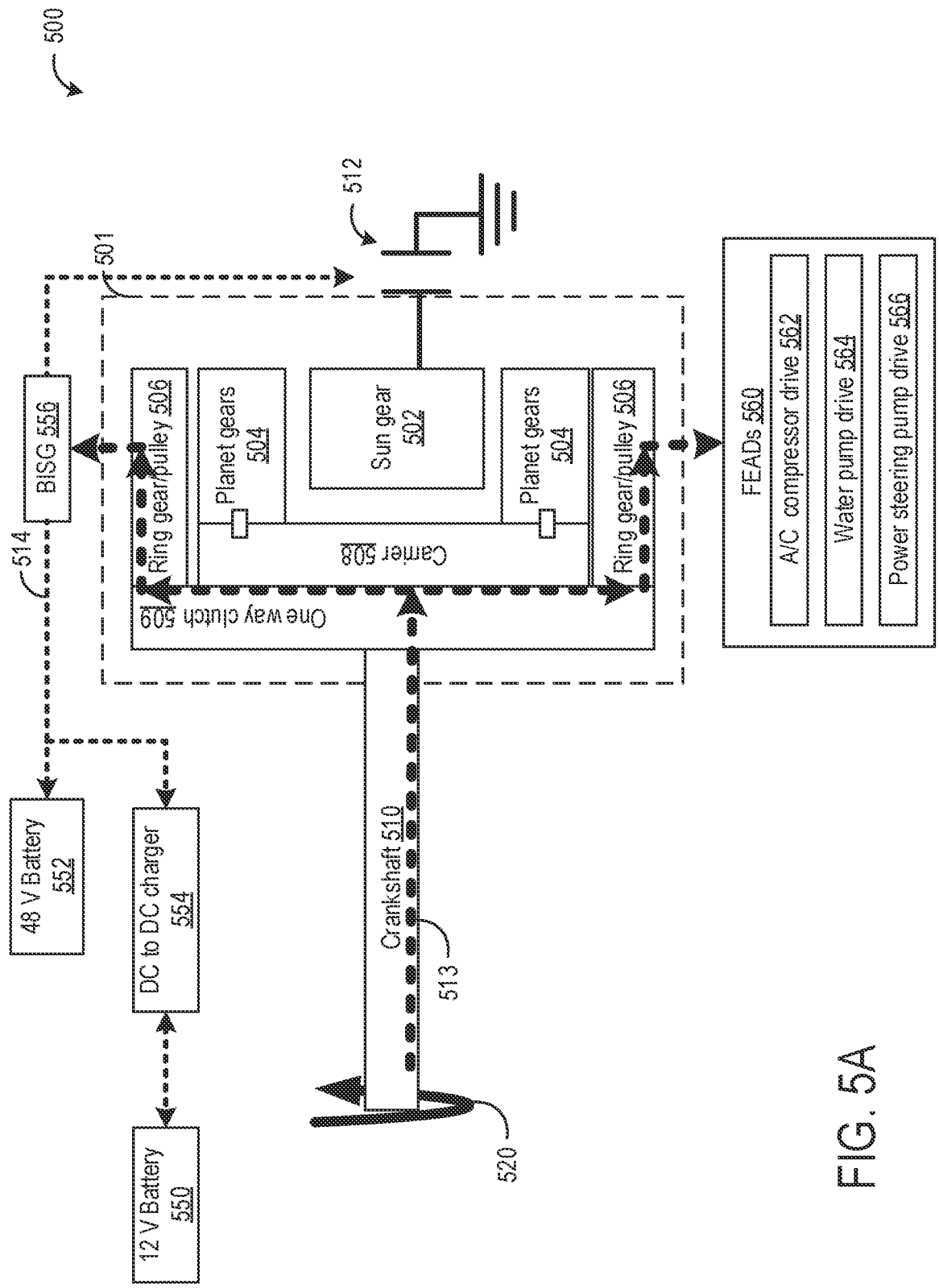
FIG. 5A shows a power flow diagram indicating a flow of mechanical power and a flow of electrical power through a FEAD drive system in a first condition when an electromagnetic clutch is not engaged.
Figure 5B:
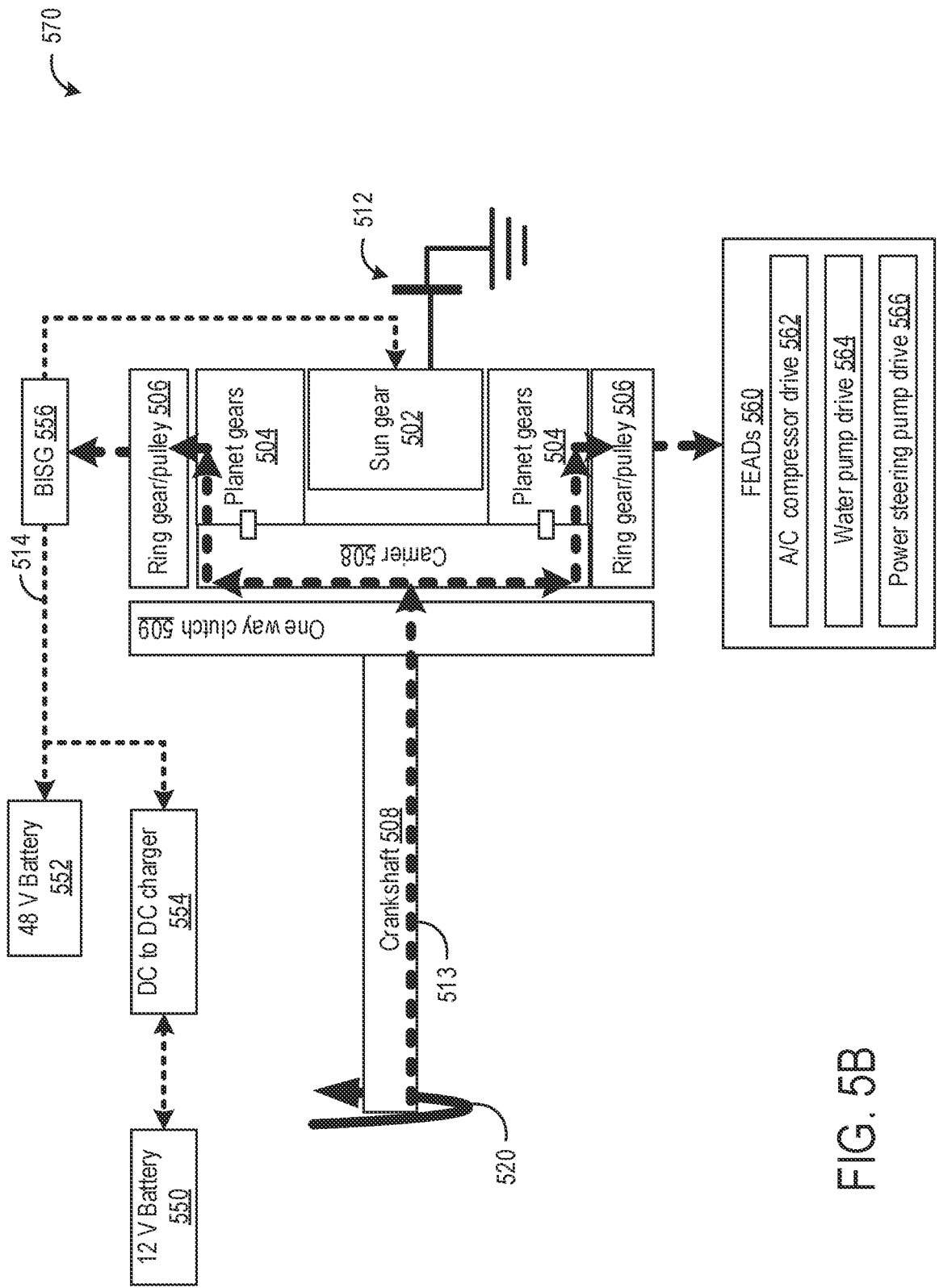
FIG. 5B shows a power flow diagram indicating a flow of mechanical power and a flow of electrical power through a FEAD drive system in a second condition when the electromagnetic clutch is engaged.

The following description relates to systems and methods for operating one or more belt-driven front end accessory devices of a hybrid vehicle, such as the hybrid electric vehicle (HEV) of FIG. 1. The hybrid vehicle may include a multi-cylinder internal combustion engine, where an example embodiment of one cylinder of the multi-cylinder internal combustion engine is shown in FIG. 2. A plurality of front end accessory devices such as a water pump, an air conditioner (A/C) compressor, etc., each front end accessory device with a corresponding front end accessory drive (FEAD), may be coupled to a crankshaft of the engine via a drive belt and pulley drive system, such as a two-speed accessory drive (TSAD) system including a one-way clutch and a planetary gear set, as depicted in FIG. 4. Further, an example planetary gear set is shown in FIG. 3. In a first operational mode, the TSAD may drive the belt to power the FEADs at a 1:1 ratio, as controlled by a one-way clutch, as shown in FIG. 5A, and in a second operational mode, the TSAD may drive the belt to power the FEADs at a greater than 1:1 ratio, as controlled by a planetary gear set, as shown in FIG. 5B. For example, during driving conditions where the vehicle may be driven at a lower engine speed to increase an efficiency of the engine (e.g., during overdrive), the planetary gear set may maintain the TSAD at a higher speed than the engine, thereby maintaining or increasing a performance of the front end accessory devices and/or generating electrical power that may be stored in a battery for future use. An electromagnetic clutch may be used to switch between the first operational mode and the second operational mode, where the electromagnetic clutch may be engaged and disengaged in accordance with the procedure described in FIGS. 6A and 6B. An engagement and disengagement of the electromagnetic clutch may be timed in accordance with an operational sequence shown in FIG. 7, where states of different gears of the planetary gear set and the electromagnetic clutch are shown at different steps in the operational sequence.

Turning now to the figures, FIG. 1 depicts a hybrid vehicle 100. In the depicted embodiment, the hybrid vehicle is a hybrid electric vehicle (HEV). Hybrid vehicle 100 includes an internal combustion engine 10 having a plurality of cylinders 30. Fuel may be provided to each cylinder of engine 10 from a fuel system (not shown) including one or more fuel tanks, one or more fuel pumps, and injectors 66.

Engine 10 delivers power to a transmission 40 via a torque input shaft 18. In one example, transmission 40 is a power-split transmission (or transaxle) that includes a planetary gear set and one or more rotating gear elements. Torque for propelling vehicle tractions wheels 52 is output from transmission 40 via a torque output shaft 19 and a differential-and-axle assembly 50.

Hybrid vehicle 100 further includes an electric machine 6 connected to torque output shaft 19, which may provide an alternate power source when the vehicle is operating under battery power. Electric machine 6 may operate as either a motor or a generator. In the depicted example, the electric machine is a belt-integrated starter generator (BISG). The electric machine 6 may be operated using electric energy from an electrical energy storage device, herein depicted as a battery 54. In some embodiments, an energy conversion device such as an inverter may be coupled between battery 54 and electric machine 6 to convert the DC output of the battery into an AC output for use by electric machine 6. However, in alternate embodiments, the inverter may be configured in electric machine 6. Electric machine 6 may be operated in a regenerative mode, that is, as a generator, to absorb kinetic energy from vehicle motion and/or the engine and convert the absorbed kinetic energy to an energy form suitable for storage in battery 54. Furthermore, electric machine 6 may be operated as a motor or generator, as desired, to augment or absorb torque provided by the engine. In one example, electric machine 6 is operated as a motor to increase a speed of an output gear of a planetary gear set of a TSAD, and/or to decrease the speed of the output gear of the planetary gear set of the TSAD, to switch between a first drive belt speed and a second drive belt speed. The electric machine 6 is described in more detail below in relation to FIGS. 4-7.

The cylinders 30 may be coupled to a crankshaft 42, allowing the energy of combustion transmitted to reciprocating motion of pistons to be translated into rotational motion of the crankshaft. Crankshaft 42 may be coupled to a drive pulley 32, such that rotational motion of crankshaft 42 may be translated to rotational motion of drive pulley 32. Drive pulley 32 may be coupled to one or more drive belts, such as a drive belt 4. Drive belt 4 may be coupled to electric machine 6 via an electric machine pulley 34, such that electric machine 6 can be operated in the regenerative mode as described above, whereby rotational energy generated by crankshaft 42 may be turned into electrical energy to be stored in battery 54, or electrical energy from battery 54 may be used to augment the rotational energy generated by crankshaft 42.

Drive belt 4 may also be coupled to one or more FEADs 20, whereby the rotational motion of crankshaft 42 is used by the FEADs 20 to power one or more front end accessory devices. For example, the front end accessory devices may include a water pump 22 driven by a water pump FEAD 21, an A/C compressor 24 driven by an A/C FEAD 23, and a power steering compressor 26 driven by a power steering FEAD 25. Additionally, each of the front end accessory devices may take a different electrical input. For example, the water pump 22 may run on a first voltage, the A/C compressor 24 may run on a second voltage, and the power steering compressor 26 may run on a third voltage, where the first, second, and third voltages are different from each other. To power each of the front end accessory devices at an appropriate voltage, drive belt 4 may be routed over a respective FEAD pulley for each of the front end accessory devices, where a diameter of the FEAD pulley may determine a rotational speed of the corresponding FEAD, which in turn may determine a corresponding voltage. For example, the water pump FEAD 21 may have a water pump FEAD pulley 36 of a first size, the A/C FEAD 23 may have an A/C FEAD pulley 37 of a second size, and the power steering FEAD 25 may have a power steering FEAD pulley 38 with a third size, where the first, second, and third sizes are different, and where the first size corresponds to the first voltage, the second size corresponds to the second voltage, and the third size corresponds to the third voltage. In this way, a plurality of front end accessory devices, each relying on different voltage differences, may be powered by the engine 10 via drive pulley 32 or by electric machine 6 via electric machine pulley 34.

In one example, drive pulley 32 is driven at the speed of crankshaft 42. In other examples, drive pulley 32 is driven at a different speed than crankshaft 42, via a TSAD 8. In one example, the TSAD 8 includes a one-way clutch and a planetary gear set, where the one-way clutch is used to power drive pulley 32 at a first drive speed, and the planetary gear set is used to power drive pulley 32 at a second drive speed. Further, the planetary gear set may be configured in different ways. For example, in a first configuration of the planetary gear set, the first drive speed may be less than the second drive speed; in a second configuration of the planetary gear set, the first drive speed may be greater than the second drive speed; and in a third configuration of the planetary gear set, the first drive speed may be the same as the second drive speed.

Referring briefly to FIG. 3, an example planetary gear set 300 is shown, which includes a ring gear 302, a sun gear 304, and a plurality of planet gears 306. In one example, the sun gear 304 and the ring gear 302 are coaxially aligned around an input shaft 320 along a central axis 310, and are configured to rotate in one of the directions indicated by directional arrow 308. The input shaft 320 may be, or may be coupled to, a crankshaft of the engine 10 (e.g., the crankshaft 42 of FIG. 1). Ring gear 302 may have a toothed interior comprising a plurality of teeth 312, and each of the planet gears 306 may have a toothed exterior comprising a plurality of teeth 314, where each planet gear 306 meshes with the toothed interior of the ring gear 302. The sun gear 304 may also have a toothed exterior comprising a plurality of teeth 305, where the toothed exterior of each planet gear 306 may also mesh with the toothed exterior of the sun gear 304.

The planet gears 306 may be coupled to a carrier 316 positioned on an opposite side of the input shaft 320 via a plurality of pins 318, such that as the planet gears 306 rotate in unison around the interior of the ring gear 302, the carrier 316 rotates in the same direction as the planet gears. Thus, like the sun gear 304 and the ring gear 302, the carrier 316 is also coaxially aligned around the input shaft 320 along the central axis 310 and is configured to rotate in one of the directions indicated by the directional arrow 308. The carrier 316 may be coupled to an output shaft 322 along the central axis 310, whereby the planet gears 306 may control the rotation of the output shaft 322. Thus, in the depicted example, the ring gear 302 is maintained in a stationary position, the sun gear 304 is the input gear, and the planet gears 306, via the carrier 316, are the output gears. In other examples, the sun gear 304 may be coupled to the output shaft 322 and the carrier 316 may be coupled to the input shaft 320, whereby the sun gear is the output gear and the planet gears 306, via the carrier 316, are the input gears. In still other examples, the input shaft 320 may be coupled to the ring gear 302, the carrier 316 may be fixed, and the sun gear 304 may be coupled to the output shaft 322, whereby the sun gear 304 is the output gear and the ring gear 302 is the input gear. In this way, the planetary gear set 300 may be configured in various ways to couple the input shaft 320 to the output shaft 322.

Further, the ratios of sizes between the sun gear 304, ring gear 302, and planet gears 306, and the choice of which gears are input and output gears and/or which gears are held stationary, may determine an epicyclic gear ratio between input and output gears, according to known planetary gearing techniques. For example, the ratio between gears implies that for one turn of the ring gear 302, the sun gear 304 turns A/S times, where A is the number of teeth 312 along the interior of the ring gear 304 and S is the number of teeth 314 along the exterior of the sun gear 304. In one example, the sun gear 304 includes 105 teeth 314 and ring gear 302 includes 210 teeth 312, resulting in the sun gear 304 turning twice for one turn of the ring gear 302. Further, if the size of the teeth is constant across gearing, the circumference (and radius) of the sun gear is one half that of the interior of the ring gear.

In a first example, the epicyclic gear ratio between an example input gear of the planetary gear set 300 and an example output gear drives an example balance mass to rotate at a speed twice that of an example crankshaft. In such an example, the ratio of teeth between the ring gear and the sun (e.g., the quantity A/S) is 4, so that the sun gear 304 rotates 4 times for one rotation of the ring gear 302. In this way, the timing of a secondary moment of the example crankshaft and connected components and elements, having a frequency twice that of the rotation of the example crankshaft, may be matched by the output gear coupled to a balance mass. In a second example, the epicyclic gear ratio between the input gear and the output gear drives the balance mass to rotate at a speed equal to that of the crankshaft. Similarly, the timing of a primary moment of the example crankshaft and connected components and elements may be matched by the output gear. Thus, based on the epicyclic gear ratio and the number of teeth 312 and teeth 314, one or more target rotations of the output shaft may be achieved from a fixed crankshaft rotation.

Returning to FIG. 1, hybrid vehicle 100 may further include a control system including a controller 12, which may include a processor 13. The processor 13 may generally include any number of microprocessors, ASICs, ICs, etc. The controller 12 may include a memory 14 (e.g., FLASH, ROM, RAM, EPROM and/or EEPROM) that stores instructions that may be executed to carry out one more control routines. As discussed herein, memory includes any non-transient computer readable medium in which programming instructions are stored. For the purposes of this disclosure, the term tangible computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

The controller 12 may be configured to receive information from a plurality of sensors 16 and sending control signals to a plurality of actuators 81. As one example, sensors 16 may include various pressure and temperature sensors, a fuel level sensor, various exhaust gas sensors, etc. The various actuators may include, for example, transmission gear actuators, TSAD gear set actuators, cylinder fuel injectors, an air intake throttle coupled to the engine intake manifold (not shown), etc. Controller 12 may receive input data from the various sensors, process the input data, and trigger the actuators in response to the processed input data based on instruction or code programmed therein corresponding to one or more routines.

The vehicle 100 may be operated by controller 12 in various modes of operation. In one example, the vehicle may be driven in a first engine-on mode, herein also referred to as an "engine mode," wherein engine 10 is used as a main source of torque for powering wheels 52. During the engine mode, fuel may be supplied to engine 10 from a fuel tank via fuel injector 66 so that the engine can combust the fuel to provide the torque for propelling the vehicle. Optionally, the engine can be operated to output more torque than is demanded for propulsion, in which case the additional power is absorbed by the electric machine 6 (in generating mode) to charge the battery 54 or supply electrical power for other vehicle loads.

In another example, the vehicle may be driven in a second engine-on mode, herein also referred to as an "assist mode." During the assist mode, engine 10 is operated and used as the main source of torque for powering wheels 52 and electric machine 6 is used as an additional torque source to act in cooperation with and supplement the torque provided by engine 10. During the assist mode, as in the engine mode, fuel is supplied to engine 10 for combustion to provide torque to the vehicle wheels.

In still another example, the vehicle may be driven in an engine-off mode, herein also referred to as an "electric mode," wherein electric machine 6 is powered by battery 54 and used as the source of torque for driving wheels 52. As such, during the electric mode, no fuel may be injected into engine 10 irrespective of whether the engine is spinning (e.g., rotating at a non-zero speed) or not (e.g., at rest, with a speed of zero). The electric mode may be employed, for example, during braking, at low vehicle speeds, while the vehicle is stopped at traffic lights, etc. During the electric mode, based on the vehicle speed and the driver demanded torque, the vehicle may be operated such that the vehicle is propelled by battery 54 via electric machine 6 with the engine not spinning (and not fueled), or the vehicle may be operated such that the vehicle is propelled by battery 54 via electric machine 6 with the engine spinning unfueled.

Referring now to FIG. 2, a schematic diagram shows one cylinder 230 of a multi-cylinder internal combustion engine 200 of a vehicle, which may be the same as or similar to the engine 10 of hybrid vehicle 100 of FIG. 1. Engine 200 may be controlled at least partially by a control system (e.g., the controller 12 of FIG. 1) and by input from a vehicle operator (not shown). Cylinder 230 may also be referred to herein as "combustion chamber 230."

Cylinder 230 of engine 200 may include combustion chamber walls 232 with a piston 236 positioned therein. Piston 236 may be coupled to a crankshaft 240 so that reciprocating motion of the piston is translated into rotational motion of the crankshaft. Crankshaft 240 may be coupled to at least one drive wheel of a vehicle via an intermediate transmission system. Further, a starter motor may be coupled to crankshaft 240 via a flywheel to enable a starting operation of engine 200. As described above in FIG. 1, crankshaft 240 may be coupled to a drive belt used to drive one or more FEADs coupled to the drive belt via pulleys. In one example, crankshaft 240 is coupled to a drive belt via a TSAD, where the drive belt is operated at one of two speeds. For example, during most driving conditions, the drive belt may be operated at a speed of crankshaft 240. If the speed of crankshaft 240 is reduced (e.g., when the vehicle is operating in overdrive), the drive belt may be operated at a speed higher than crankshaft 240, for example, to maintain an amount of electrical energy supplied to the one or more FEADs. The TSAD is described in greater detail below in reference to FIG. 4.

Cylinder 230 may receive intake air from an intake manifold 244 via an intake passage 242 and may exhaust combustion gases via an exhaust passage 248. Intake manifold 244 and exhaust passage 248 can selectively communicate with cylinder 230 via a respective intake valve 252 and an exhaust valve 254. In some embodiments, combustion chamber 230 may include two or more intake valves and/or two or more exhaust valves.

A fuel injector 266 is shown coupled directly to cylinder 230 for injecting fuel directly therein in proportion to a pulse width signal received from a controller (e.g., the controller 12 of vehicle 100 of FIG. 1) via an electronic driver, for example. In this manner, fuel injector 266 provides what is known as direct injection of fuel into cylinder 230. The fuel injector may be mounted on the side of the combustion chamber or on the top of the combustion, for example. Fuel may be delivered to fuel injector 266 by a fuel delivery system (not shown) including a fuel tank, a fuel pump, and a fuel rail. In some embodiments, cylinder 230 may alternatively or additionally include a fuel injector arranged in intake passage 242 in a configuration that provides what is known as port injection of fuel into the intake port upstream of cylinder 230.

Intake passage 242 may include a throttle 262 having a throttle plate 264 configured for electronic throttle control (ETC), which is provided as one non-limiting example. In this manner, throttle 262 may be operated to vary the intake air provided to cylinder 230 among other engine combustion cylinders. An ignition system 288 may provide an ignition spark to combustion chamber 230 via spark plug 292 in response to the controller.

As described above, FIG. 2 shows only one cylinder of a multi-cylinder engine, and each cylinder may similarly include its own set of intake/exhaust valves, fuel injector, ignition system, etc. During operation, the multi-cylinder engine may undergo a four stroke cycle wherein the actuation of the crankshaft and camshafts are synchronized by an engine drive system. Further, the engine drive system may include various other accessory drives coupled to the engine drive system via one or more belts, pulleys, etc. For example, an oil or water pump, A/C compressor, power steering compressor, balance shaft, fan, etc. may be driven by the engine drive system. An example engine drive system for powering FEADs is described in more detail below in reference to FIG. 4.

FIG. 4 shows a cross-sectional view of an example TSAD 400 of a hybrid vehicle with a two-speed planetary gear set for controlling the TSAD at two different speeds. The TSAD 400 may be the same as or similar to the TSAD 8 of the hybrid vehicle 100 of FIG. 1. The two-speed planetary gear set may be the same as or similar to the example planetary gear set 300 of FIG. 3.

The TSAD 400 may be coupled to an engine of the vehicle via a crankshaft 402, coaxially aligned along a central axis 404. The two-speed planetary gear set of the TSAD 400 may include a ring gear 434, a sun gear 424, and a plurality of planet gears that couple the ring gear 434 to the sun gear 424 in accordance with a configuration of the planetary gear set. In the depicted example, the crankshaft 402 is coupled to a carrier 406, which acts as a hub onto which the plurality of planet gears are coupled. For example, a first planet gear 408 is coupled to the carrier 406 via a pin 410, coaxially aligned along a central axis 412, and a second planet gear 414 is coupled to the carrier 406 via a pin 416, coaxially aligned along a central axis 418. While two planet gears are depicted in the cross-sectional view of the TSAD 400, additional planet gears may be coupled to the carrier 406, where the planet gears rotate in concert to collectively transfer a rotational motion of the crankshaft 402 to the carrier 406. Further, carrier 406 may include a torsional damper feature 420, which may reduce a mechanical vibration of the crankshaft 402 during operation.

The ring gear 434 may be coupled to a drive pulley (not depicted in FIG. 4) that drives a drive belt used to power one or more FEADs of the hybrid vehicle. In one example, the drive belt may be routed around the ring gear 434, whereby the ring gear 434 functions as the drive pulley, and where a rotation of the ring gear 434 causes a motion of the drive belt in a direction of the rotation of the ring gear 434. The rotation of the ring gear 434 may be at a first speed, corresponding to a first gear ratio of a first operational mode of the TSAD 400, or at a second speed, corresponding to a second gear ratio of a second operational mode of the TSAD 400. In one example, in the first operational mode, the ring gear 434 rotates at a first speed of the crankshaft 402, where a gear ratio of the ring gear 434 with the crankshaft 402 is 1:1, and in the second operational mode, the ring gear 434 rotates at a second speed that is greater than the speed of the crankshaft 402, where the gear ratio of the ring gear 434 with the crankshaft 402 is greater than 1:1. In one example, the gear ratio in the second operational mode is 1.6:1, whereby the drive belt is driven at a speed that is 1.6 times the speed of the crankshaft 402. Thus, by switching between the first operational mode and the second operational mode, a speed of the ring gear 434 may be adjusted between the first speed (e.g., engine speed) and the second speed (e.g., greater than engine speed) of the TSAD.

By increasing the speed of the ring gear 434, a speed of the drive belt may be increased, which may provide an increase in power to the one or more FEADs and/or an electric machine, such as a BISG (e.g., the electric machine 6 of vehicle 100 of FIG. 1) coupled to the drive belt. As a result of the increase in power, a performance of one or more front end accessory devices corresponding to the FEADs may be increased or maintained constant in the event of a decrease in engine speed, and/or the electric machine may be operated as a generator to store surplus power in a battery of the vehicle.

For example, in the first operational mode, the carrier 406, sun gear 424, and ring gear 434 may rotate at the speed of the crankshaft 402. A roller one-way clutch 432 may be coupled to the crankshaft 402, shown in FIG. 4 as arranged between an electromagnetic cone clutch 426 and the ring gear 434, whereby in a first one-way clutch state, the one-way clutch 432 is engaged, and a torque of the crankshaft 402 is transferred through the one-way clutch 432 to the ring gear 434. In the first operational mode, all the gears of the planetary gear set (e.g., the ring gear 434, the sun gear 424, and the planet gears 408, 414, etc.) are driven at the speed of the crankshaft 402 (e.g., in a 1:1 gear ratio). In a second one-way clutch state, the torque of the crankshaft 402 is transferred from the carrier 406 through the sun gear 434 to the ring gear 434, whereby the ring gear 434 is driven at a higher speed than the crankshaft 402 in accordance with a higher gear ratio of the ring gear 434 and the crankshaft 402 (e.g., in a 1.6:1 gear ratio), and the one-way clutch 432 is overrun. Thus, by adjusting a configuration of the TSAD 400, the drive belt may be driven at an engine speed, for example, during typical driving, or at a higher than engine speed, for example, when the vehicle is in overdrive. In one example, the drive belt is driven at the higher than engine speed to maintain an energy input of the one or more front end accessory devices. In another example, the drive belt is driven at the higher than engine speed to generate a surplus of electrical energy to be stored in a battery of the vehicle, via the electric machine coupled to the drive belt (e.g., a BISG, an alternator, etc.).

Transitioning between the first operational mode and the second operational mode may be accomplished via the electromagnetic cone clutch 426. The electromagnetic cone clutch 426 may include an electric coil 430 coupled to an engine block of the vehicle via a coil support 428. When shifting from the first operational mode into the second operational mode, a current may be introduced into the electric coil 432 to engage the electromagnetic cone clutch 426, thereby coupling the crankshaft to the ring gear 434 via the planetary gear set. When shifting from the second operational mode into the first operational mode, the current to the electric coil 432 may be switched off, thereby disengaging the electromagnetic cone clutch 426 and coupling the crankshaft to the ring gear 434 via the one-way clutch 432.

Further, to avert undesired noise, vibration, and/or harshness (NVH) when transitioning between the first operational mode and the second operational mode, a speed matching algorithm may be employed to facilitate smooth engagement and disengagement of the electromagnetic clutch 426. For example, prior to engaging the electromagnetic clutch 426 to shift from the first operational mode to the second operational mode, the speed of the ring gear 434 may be increased by a belt-integrated electric machine (e.g., the electric machine 6 of vehicle 100 of FIG. 1). Because the speed of the carrier 406 is maintained constant at the speed of the crankshaft 402, as the speed of the ring gear 434 reaches a target speed (e.g., a speed that drives the drive belt at a desired speed based on electrical demands of the one or more front end accessory devices, etc.), a speed of the sun gear 424 is proportionally reduced to the clutch engagement threshold speed. When the speed of the sun gear 424 reaches the clutch engagement threshold speed, the electromagnetic cone clutch 426 is engaged. The speed matching algorithm is described in greater detail below in relation to FIGS. 5A and 5B.

As one example, the vehicle may be transitioning from a city environment to a highway. During operation in the city environment, an A/C compressor and a power steering compressor may be powered by the engine of the vehicle via a drive belt routed around a pulley coupled to the ring gear 434 of the TSAD 400. The A/C compressor runs on a first voltage generated by an A/C compressor drive coupled to the drive belt, and the power steering compressor runs on a second voltage generated by a power steering compressor drive coupled to the drive belt. To generate the first and second voltages, the A/C compressor drive and the power steering compressor drive may be coupled to the drive belt via pulleys of different sizes, based on a gear ratio of the A/C compressor drive and the power steering compressor drive. During operation in the city environment, the TSAD 400 may run in the first operational mode, where the ring gear 434 is driven at the speed of the crankshaft 402 (e.g., at an engine speed) via the one-way clutch 432.

As the vehicle enters the highway, the engine speed of the vehicle increases as a speed of the vehicle increases (e.g., during acceleration). When the vehicle achieves a speed of traffic (e.g., a speed at which other vehicles are traveling on the highway), an automatic transmission of the vehicle may shift the vehicle into overdrive, whereby the engine speed is decreased to increase fuel efficiency, and the speed of the vehicle is maintained by a higher gear ratio of the automatic transmission. As a result of the decreased engine speed, the speed of the drive belt decreases, thereby decreasing an amount of energy supplied to the A/C compressor drive and the power steering drive, causing the A/C compressor and/or the power steering compressor to suffer a reduction in performance. In response to the reduction in performance, a controller of the vehicle may command the TSAD 400 to shift from the first operational mode to the second operational mode of the TSAD. To shift from the first operational mode to the second operational mode, the TSAD may command the belt-integrated electric machine to apply an additional torque to the drive belt, which increases the speed of the drive belt. As the drive belt is driven at a higher speed, increased power is provided to the A/C compressor drive and the power steering compressor drive to increase the performance of the A/C compressor and/or the power steering compressor. Concurrently, as the speed of the drive belt is increased, the speed of the ring gear 434 increases correspondingly. When the ring gear 434 and drive belt reach a desired speed (e.g., based on power usage of the front end accessory devices), the speed of the sun gear 424 is reduced to the clutch engagement threshold speed, due to the carrier 406 being maintained at a constant rotational velocity of the crankshaft. When the speed of the sun gear 424 is reduced to the clutch engagement threshold speed, a current is supplied to the electric coil 430 to engage the electromagnetic clutch 426. When the electromagnetic clutch 426 is engaged, the rotation of crankshaft 404 is transferred to the ring gear 434 via the planetary gear set (e.g., the planet gears 408, 414, etc., the sun gear 324, and the ring gear 434). When the rotational speed of the ring gear 434 is driving the drive belt at the desired speed, the one-way clutch is over-run. After engagement of the electromagnetic clutch 426, the belt-integrated electric machine may switch from a motor mode to a generator mode, where the belt-integrated electric machine may stop applying an additional torque to the drive belt and begin to generate electric energy via the drive belt, to be stored in a battery of the vehicle.

When the vehicle exits the highway and returns to city driving conditions, the electromagnetic clutch 426 is disengaged. The belt-integrated electric machine switches from the generator mode to the motor mode, and applies a torque to the drive belt in the opposite direction of the motion of the drive belt and rotation of the ring gear 434, thereby decreasing the speed of the drive belt and the speed of the ring gear 434. As the speed of the ring gear 434 decreases, the speed of the sun gear 424 increases until the ring gear 434, the sun gear 424, and the carrier 406 are rotating at the speed of the crankshaft. When the ring gear 434, the sun gear 424, and the carrier 406 are rotating at the speed of the crankshaft, the one-way clutch 432 is engaged, whereby the ring gear 434 is powered by the one-way clutch 432 and not by the planetary gear set. After engagement of the one-way clutch 432, the belt-integrated electric machine stops functioning in the motor mode, and resumes functioning in the generator mode.

Turning to FIG. 5A, a power diagram 500 is shown that indicates a flow of electrical energy and a flow of mechanical energy through a TSAD 501 of a vehicle (e.g., the vehicle 100 of FIG. 1), during the first operational mode described above in reference to FIG. 4. The TSAD 501 may be the same as or similar to the TSAD 400 of FIG. 4. During the first operational mode, the TSAD 501 drives a drive belt at a speed of an engine of the vehicle. TSAD 501 includes a planetary gear set with a sun gear 502, a ring gear 506, and a plurality of planet gears 504 coupled to a carrier 508. The ring gear 506 may additionally act as a pulley that drives a drive belt (not depicted in FIG. 5A), to which a belt-integrated starter generator (BISG) 556 may be coupled. In one example, the BISG 556 is electrically coupled to one or more batteries, such as a 48 V battery 552 and/or a 12 V battery 550, as well as one or more DC to DC chargers, such as a DC to DC charger 554. In addition to the BISG 556, one or more FEADs 560 may be coupled to the drive belt. For example, the FEADs 560 may include an A/C compressor drive 562, a water pump drive 564, and a power steering pump drive 566, which may be used to power an AC compressor, water pump, and power steering pump respectively.

The TSAD 501 also includes a one-way clutch 509. The one-way clutch 509 is coupled to a crankshaft 510 of the vehicle, which is rotated by an engine of the vehicle during operation in a direction indicated by a directional arrow 520. As the crankshaft 510 rotates, the one-way clutch 509 rotates with the crankshaft 510 at a speed of the crankshaft 510. The one-way clutch 509 may also engage the ring gear/pulley 506, where in a first, engaged state of the one-way clutch, the crankshaft 510 rotates the one-way clutch 509, and the one-way clutch 509 rotates the ring gear/pulley 506 at a speed of the crankshaft. In a second, over-run state of the one-way clutch, a rotational speed of the ring gear/pulley 506 exceeds the speed of the crankshaft and the one-way clutch, and the one-way clutch is over-run. The flow of mechanical energy is shown in FIG. 5A as a black dashed line 513, where the mechanical energy, in the form of a rotation of the crankshaft 510, is transferred first to the one-way clutch 509, and then to the ring gear/pulley 506. As the ring gear/pulley 506 rotates as a result of the rotation of the crankshaft 510, the mechanical energy is transferred through the belt drive to the BISG 556. The BISG 556 transfers the mechanical energy received via the belt drive into electrical energy, shown in FIG. 5A as a gray dashed line 514. The electrical energy generated by the BISG 556 is transferred, as shown by line 514, to the 48 V battery 552 and/or the 12 V battery 550, via the DC to DC charger 554.

The TSAD 501 includes an electromagnetic clutch 512. In a first, disengaged state, the electromagnetic clutch 512 is not coupled to the sun gear 502, and the sun gear is permitted to rotate freely in accordance with a rotation of the ring gear/pulley 506 (e.g., at a speed of the crankshaft 510). In a second, engaged state, the electromagnetic clutch 512 is coupled to the sun gear 502, and the sun gear 502 is not permitted to rotate freely and is maintained in a fixed, stationary position. In one example, the electrical energy used to power the electromagnetic clutch 512 is generated by the BISG 556, as shown by the gray dashed line 514. When the electromagnetic clutch 512 is engaged, the crankshaft 510 rotates the ring gear/pulley 506 via the carrier 508 and the planetary gear set, and when the electromagnetic clutch 512 is disengaged, the crankshaft 510 rotates the ring gear/pulley 506 via the one-way clutch 509. FIG. 5A shows the electromagnetic clutch 512 in the first, disengaged state, corresponding to the first operational state of the TSAD 501, where the crankshaft 510 rotates the ring gear/pulley 506 via the one-way clutch 509. As a result, the ring gear/pulley 506 is rotated at an engine speed (e.g., the speed of the crankshaft 510).

Referring to FIG. 5B, a power diagram 570 indicates the flow of electrical energy and the flow of mechanical energy through the TSAD 501 during the second operational mode described above in reference to FIG. 4, where the electromagnetic clutch 512 is in the second, engaged state. During the second operational mode where the electromagnetic clutch 512 is in the second, engaged state, the flow of mechanical energy depicted by the black dashed line 513 is not transferred to the ring gear/pulley 506 via the one-way clutch 509; rather, the mechanical energy is transferred to the ring gear/pulley 506 via the carrier 508 and the plurality of planet gears 504 (e.g., via the planetary gear set). When the electromagnetic clutch 512 is in the second, engaged state and the crankshaft 510 is rotating the ring gear/pulley 506 via the planetary gear set, as a result of differing gear ratios between the sun gear 502, the plurality of planet gears 504, and the ring gear 506, the ring gear/pulley 506 may be driven at a higher speed than engine speed (e.g., a higher speed than the speed of the crankshaft 510). For example, if the gear ratio between the carrier 508 (e.g., the plurality of planet gears 504) and the ring gear/pulley 506 is 1.6:1, the ring gear/pulley 506 may be driven at 1.6 times the speed of the crankshaft 510. In this way, the speed of the ring gear/pulley 506 and the drive belt may be adjusted between the engine speed and the higher than engine speed by either coupling the crankshaft 510 to the ring gear/pulley 506 via the one-way clutch, or coupling the crankshaft 510 to the ring gear/pulley 506 via the planetary gear set.

Further, to reduce a level of NVH that may be experienced by a driver of the vehicle, an efficiency or smoothness of engagement of the electromagnetic clutch 512 (e.g., to fix a position of the sun gear 502) may be increased by reducing a speed of the sun gear 502 and engaging the electromagnetic clutch 512 when the speed of the sun gear 502 is below a threshold speed (e.g., close to 0 RPM). In one example, to reduce the speed of the sun gear 502 to below the threshold speed, the BISG 556 applies torque to the drive belt to increase the speed of the ring gear/pulley 506. As the speed of the ring gear/pulley 506 increases to a target speed (e.g., a desired speed of the drive belt, based on a power usage of the FEADs 560), due to the carrier 508 being maintained at the speed of the crankshaft 508, the speed of the sun gear 502 is correspondingly reduced to the threshold speed. When the speed of the sun gear 502 is at the threshold speed, the electromagnetic clutch 512 is engaged. An example procedure for reducing the speed of the sun gear 502 to engage the electromagnetic clutch 512 is described in greater detail below in relation to FIGS. 6A and 6B.

Figure 6A:
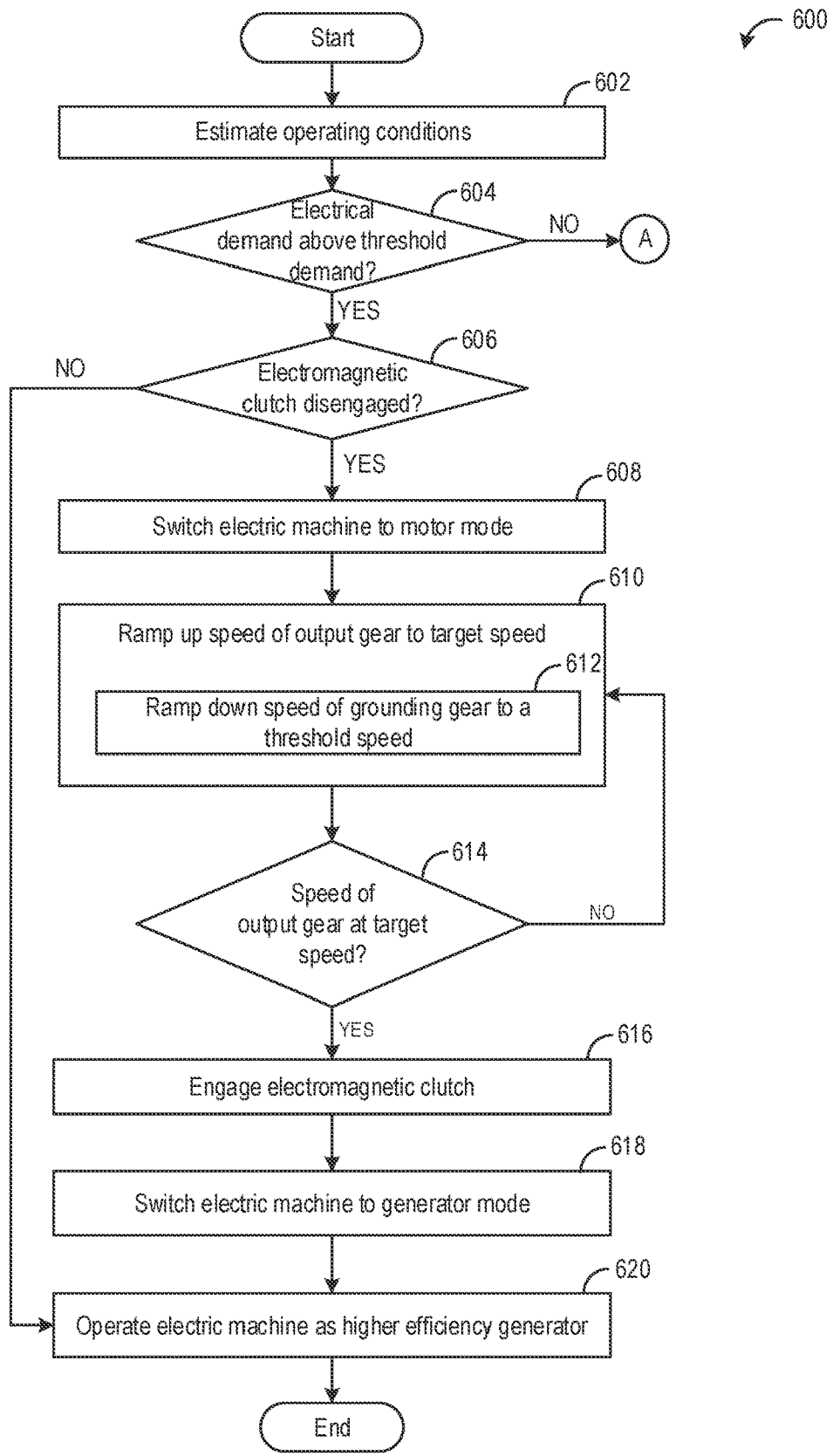
FIGS. 6A and 6B show a flow chart for an example procedure for engaging and disengaging the electromagnetic clutch.
Figure 6B:
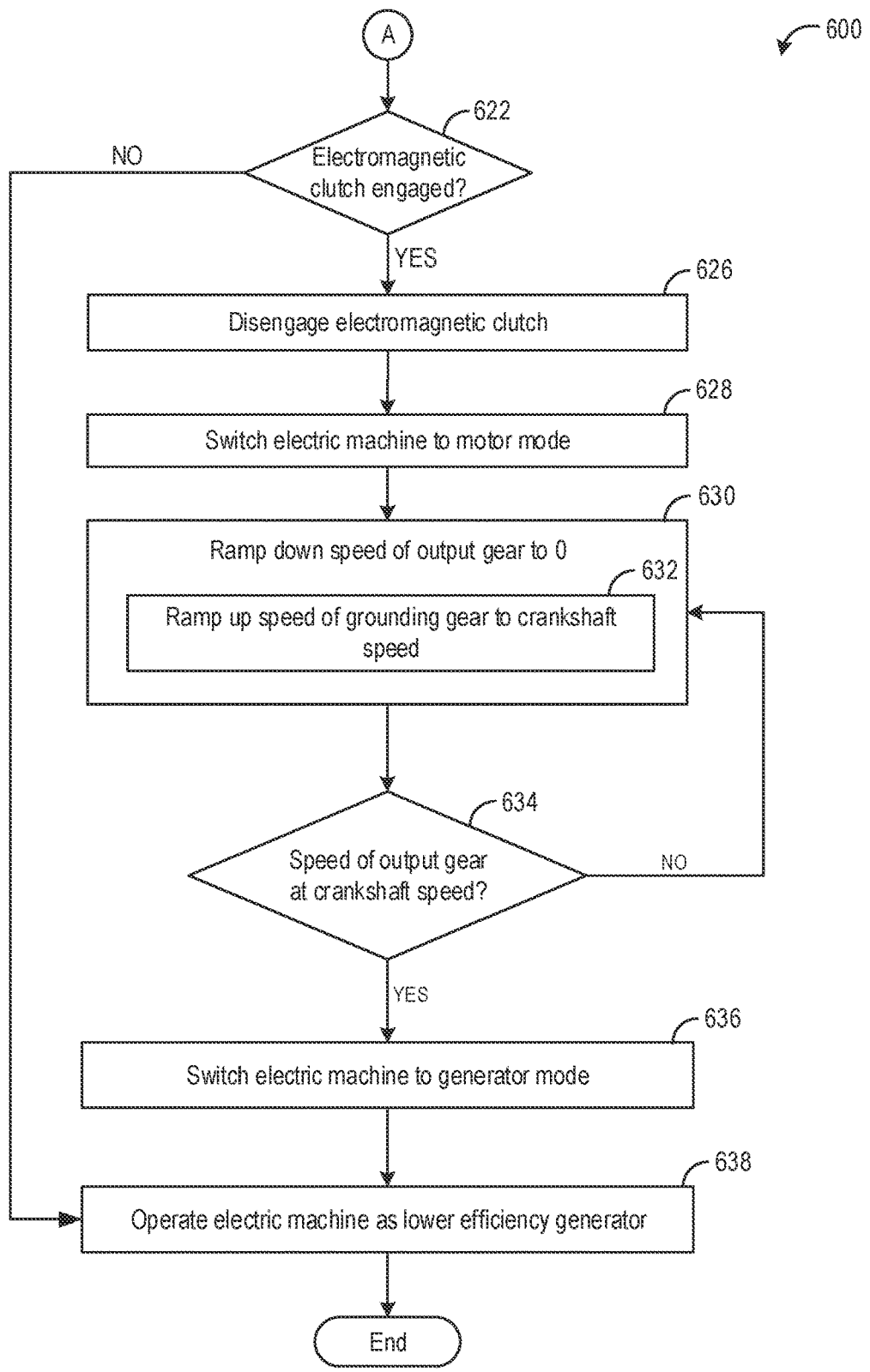

Referring now to FIGS. 6A and 6B, an exemplary method 600 is shown for engaging an electromagnetic clutch of a TSAD of a vehicle to operate the TSAD at a higher drive speed via a first gear ratio of a planetary gear set of the TSAD, or disengaging the electromagnetic clutch of a TSAD of a vehicle to operate the TSAD at a lower drive speed via a second gear ratio of a planetary gear set of the TSAD. The TSAD may be the same as or similar to the TSAD 400 of FIG. 4 and/or the TSAD 501 of FIG. 5A. When the electromagnetic clutch is disengaged, the TSAD may be operating in the first operational mode described in relation to FIG. 5A, where the TSAD is driving a drive belt of the FEAD drive system at a speed of an engine of the vehicle. When the electromagnetic clutch is engaged, the TSAD may be operating in the second operational mode described in relation to FIG. 5B, where the TSAD is driving a drive belt of the FEAD drive system at a higher speed than the speed of the engine. Instructions for carrying out method 600 and all other methods included herein may be executed by a controller (e.g., the controller 12 of vehicle 100 of FIG. 1) based on instructions stored on a memory of the controller (e.g., the memory 14 of vehicle 100 of FIG. 1) and in conjunction with signals received from sensors of the vehicle, such as the sensors described above in relation to FIG. 1. The controller may employ actuators of the vehicle in accordance with the methods described below.

Referring first to FIG. 6A, at 602, method 600 includes estimating and/or measuring vehicle operating conditions. Vehicle operating conditions may be estimated based on one or more outputs of various sensors of the vehicle (e.g., such as oil temperature sensors, engine speed or wheel speed sensors, torque sensors, etc., as described above in reference to vehicle hybrid vehicle 100 of FIG. 1). Vehicle operating conditions may include engine speed and load, vehicle speed, transmission oil temperature, exhaust gas flow rate, mass air flow rate, coolant temperature, coolant flow rate, engine oil pressures (e.g., oil gallery pressures), operating modes of one or more intake valves and/or exhaust valves, electric motor speed, battery charge, an electrical demand, engine torque output, vehicle wheel torque, etc. Estimating and/or measuring vehicle operating conditions may include determining whether the vehicle is being powered by an engine or an electric motor (e.g., the engine 10 or the electric machine 6 of vehicle 100 of FIG. 1).

At 604, method 600 includes determining whether the electrical demand is higher than a threshold electrical demand. In one example, the threshold electrical demand may correspond to an upper bound of a typical electrical demand range of the vehicle. For example, during operation of the vehicle in one of a plurality of drive gears of a transmission of the vehicle, the typical electrical demand range of the FEAD system may be a power range for powering one or more front end accessory devices of the FEAD system in accordance with manufacturer specifications (e.g., without causing damage to the one or more FEADs and/or causing a corresponding front end accessory device to perform outside manufacturer specifications). In contrast, the electrical demand may be higher than the threshold electrical demand for battery charging or increased electrical load, such as due to powering a plurality of accessories or a heavy duty tool (e.g., a snow plow). In some examples, the threshold electrical demand may be a constant, non-zero value, while in other examples, the threshold electrical demand may vary based on the engine speed. For example, the threshold electrical demand may decrease as the engine speed decreases, as the lower engine speed may result in lower efficiency electrical production, particularly when the TSAD is operating in the first operational mode (e.g., with the electromagnetic clutch disengaged).

If it is determined that the electrical demand is above the threshold electrical demand at 604, method 600 proceeds to 606. At 606, method 600 includes determining whether the electromagnetic clutch of the vehicle is disengaged. For example, the electromagnetic clutch may be in a disengaged state, corresponding to the first operational mode, where the TSAD is being driven at the speed of the engine, or in an engaged state, corresponding to the second operational mode, where the TSAD is being driven at a higher speed than the engine speed. If the electromagnetic clutch is disengaged at 606, method 600 proceeds to 608.

At 608, method 600 includes switching an electric machine of the vehicle from a generator mode to a motor mode. For example, the electric machine may be a BISG coupled to the drive belt of the TSAD, as described above in relation to FIGS. 5A and 5B. In a first state of the BISG, the BISG may function in a generator mode, where the TSAD uses a rotation of a crankshaft of the engine to drive the drive belt, and a pulley of the BISG coupled to the drive belt is used to transfer mechanical energy generated by the rotation of the crankshaft to electrical energy to be stored in one or more batteries of the vehicle (e.g., the battery 54 of vehicle 100 of FIG. 1, the 48 V battery 552 of TSAD 501 of FIG. 5, and/or the 12 V battery 550 of TSAD 501 of FIG. 5). In a second state of the BISG, the BISG may function in a motor mode, where the BISG applies a torque to the pulley of the BISG that increases or decreases a speed of the drive belt. For example, torque may be applied to increase the speed of the drive belt to provide additional power to the FEADs of the FEAD drive system, or torque may be applied to decrease the speed of the drive belt when an engine speed increases (e.g., when the vehicle shifts out of an overdrive gear).

At 610, method 600 includes ramping up a speed of the output gear of the TSAD to a target speed. The target speed may be a desired speed of the drive belt based on a power usage of the front end accessory devices of the FEAD drive system. For example, each of the front end accessory devices powered by a corresponding FEAD of the FEAD drive system may rely on a voltage difference, where the desired speed of the drive belt is a speed that may efficiently provide a power demanded by the voltage differences of each of the front end accessory devices via one or more pulleys of varying sizes.

Ramping up the speed of the output gear may include increasing a rotational speed of the output gear by driving the drive belt at an increased speed, for example, via the electric machine. Where the planetary gear set includes a ring gear, a sun gear, and a plurality of planet gears coupled to a carrier, in one example, the carrier is an input gear, and the ring gear is the output gear, where the drive belt is coupled to a pulley of the ring gear. In some examples, the ring gear is coupled to a pulley, while in other examples, the ring gear functions as a pulley where the drive belt is routed around the ring gear. The sun gear is a grounding gear (e.g., a gear that is grounded and maintained stationary in a configuration of the planetary gear set), where a speed of the grounding gear may be proportionally decreased to a clutch engagement threshold speed (e.g., 1-2 RPM) as the speed of the output gear increases to the target speed. To ramp up the speed of the output gear, the electric machine may apply a torque to the drive belt (e.g., during the motor mode) in a direction of the drive belt, whereby a summation of the torque applied to the drive belt by the electric machine and a torque applied by the engine causes the drive belt to be driven at a higher speed than the engine speed. As the speed of the drive belt increases, the speed of the output gear increases, until achieving the target speed. In other examples, the carrier is the input gear, the sun gear is the output gear, and the ring gear is the grounding gear. In still other examples, the sun gear is the input gear, the ring gear is the output gear, and the carrier is the grounding gear. It should be appreciated that the examples provided herein are for illustrative purposes, and different configurations of input, output, and grounding gears may be employed without departing from the scope of this disclosure.

At 612, the speed of the grounding gear is ramped down to the clutch engagement threshold speed. A ramping down of the speed of the grounding gear may be proportional to a ramping up of the speed of the output gear, as a result of a configuration of the planetary gear set. For example, if the speed of the input gear is maintained constant at a speed of a crankshaft of the engine, an increase in the speed of the output gear is offset by a decrease in the speed of the grounding gear, such that a summation of the speed of the output gear and the speed of the grounding gear is equal to the speed of the carrier (e.g., the speed of the crankshaft). Thus, the speed of the output gear may be increased by decreasing the speed of the grounding gear, or the speed of the grounding gear may be decreased by increasing the speed of the grounding gear.

At 614, method 600 includes determining whether the speed of the output gear is the target speed. If the speed of the output gear is not the target speed, method 600 returns to 610, where method 600 includes continuing to ramp up the speed of the output gear. If the speed of the output gear at 614 is the target speed, method 600 proceeds to 616. At 616, method 600 includes engaging the electromagnetic clutch. In one example, the electromagnetic clutch is a cone clutch, and engaging the electromagnetic clutch includes providing a current to an electric coil of the electromagnetic clutch (e.g., the electric coil 430 of the TSAD 400 of FIG. 4) to engage the electromagnetic clutch. By engaging the electromagnetic clutch when the speed of the grounding gear is at or near the clutch engagement threshold speed, an amount of NVH may be reduced, thereby improving a driving experience and/or performance of the vehicle and decreasing a wear of one or more components of the electromagnetic clutch.

Prior to engaging the electromagnetic clutch, the grounding gear of the planetary gear set may be allowed to rotate freely, whereby the output gear of the planetary gear set may not be driven by the configuration of gears of the planetary gear set, and the output gear of the planetary gear set may be driven by a coupling of the crankshaft to the output gear external to the planetary gear set. In one example, the output gear of the planetary gear set is coupled to the crankshaft via a one-way clutch, where prior to engaging the electromagnetic clutch, the output gear is driven by the crankshaft via the one-way clutch. When the electromagnetic clutch is engaged, the output gear stops being driven by the one-way clutch, and instead is driven by the gears of the planetary gear set (e.g., at a higher speed). In other words, the one-way clutch may continue to couple the crankshaft to the output gear, but the higher speed of the output gear generated by the electric machine operating in the motor mode may cause the one-way clutch to be overrun.

As the output gear stops being driven by the one-way clutch, and instead is driven by the gears of the planetary gear set, the torque applied by the electric machine to increase the speed of the drive belt during the motor mode of the electric machine is supplanted by a torque applied by the output gear. At 618, method 600 includes switching the electric machine to the generator mode, where the electric machine no longer applies torque to the drive belt, and a propulsion of the drive belt is maintained by the planetary gear set.

At 620, method 600 includes operating the electric machine as a higher efficiency generator, where electricity is generated by the electric machine via a pulley around which the drive belt is routed and stored in the one or more batteries of the vehicle described above. Operating the electric machine as the higher efficiency generator includes operating in the second operational mode described above with respect to FIG. 5B. Further, because the electromagnetic clutch is engaged and the output gear is driven by the gears of the planetary gear set at a higher speed than the engine, the electric machine provides higher efficiency electrical generation than when the output gear is driven by the one-way clutch.

Returning to 606, if the electromagnetic clutch is not disengaged (e.g., the electromagnetic clutch is already engaged), method 600 proceeds to 620 and includes operating the electric machine as the higher efficiency generator, as described above. Method 600 may then end. In this way, responsive to the electrical demand being above the threshold electrical demand, the electromagnetic clutch of the TSAD is engaged (or maintained engaged) in order to provide higher efficiency electrical generation (e.g., more rotations of the output gear for each rotation of the input gear) even at low engine speeds.

Alternatively, if at 604 it is determined that the electrical demand is not above the threshold demand, method 600 proceeds to 622. Referring now to FIG. 6B, at 622, method 600 includes determining whether the electromagnetic clutch is engaged, as described above in relation to 606. If it is determined that the electromagnetic clutch is not engaged, method 600 proceeds to 638, and the electric machine is operated as a lower efficiency generator. For example, the efficiency of the electrical generation is less than when the electromagnetic clutch is engaged and the speed of the output gear is higher than that of the input gear (and the engine). Further, operating as the lower efficiency generator may be a base electrical generation state of the electric machine.

If at 622 it is determined that the electromagnetic clutch is engaged, method 600 proceeds to 626. For example, the electrical demand may decrease below the threshold electrical demand while the electric machine is operating as a higher efficiency generator, and in response to the electrical demand decreasing below the threshold electrical demand, the electric machine may be transitioned back to operating as a lower efficiency generator via adjustments to the TSAD system. Therefore, at 626, method 600 includes disengaging the electromagnetic clutch, which allows the vehicle to return to operation in the first operational mode. In one example, where the electromagnetic clutch is a cone clutch, disengaging the electromagnetic clutch includes turning off a current to an electric coil of the electromagnetic clutch to disengage the electromagnetic clutch. Prior to disengaging the electromagnetic clutch, the output gear of the planetary gear set may be driven by the configuration of gears of the planetary gear set. When the electromagnetic clutch is disengaged, the output gear stops being driven by the planetary gear set. As the planetary gear set drives the drive belt at a higher-than-engine speed, when the electromagnetic clutch is disengaged, the speed of the drive belt slowly decreases until reaching the speed of the crankshaft, whereupon the vehicle operates in the first operational mode.

At 628, method 600 includes switching the electric machine from the generator mode to the motor mode, where the electric machine may apply a torque to the pulley of the TSAD that adjusts a speed of the drive belt, as described above. At 630, method 600 includes ramping down the speed of the output gear of the TSAD from the target speed to the crankshaft speed (e.g., the speed of the input gear). Ramping down the speed of the output gear may include decreasing the rotational speed of the output gear by driving the drive belt at a slower speed. To ramp down the speed of the output gear, the electric machine applies a torque to the drive belt in a direction opposite to the direction of the drive belt, whereby the torque applied by the electric machine causes the drive belt to be driven at a lower speed than the engine speed. As the speed of the drive belt decreases, the speed of the output gear decreases, until achieving the speed of the crankshaft.

At 632, the speed of the grounding gear is ramped up to the crankshaft speed. A ramping up of the speed of the grounding gear may be proportional to a ramping down of the speed of the output gear, as a result of a configuration of the planetary gear set. For example, if the speed of the input gear is maintained constant at the speed of the crankshaft, a decrease in the speed of the output gear is offset by an increase in the speed of the grounding gear, until the speed of the output gear and the speed of the input gear converge at the speed of the carrier and the crankshaft.

At 634, method 600 includes determining whether the speed of the output gear is the crankshaft (e.g., engine) speed. When the speed of the output gear is the crankshaft speed, the one-way clutch stops being over-run, where the output gear is driven by the one-way clutch. If the speed of the output gear is not the crankshaft speed, method 600 returns to 630, where method 600 includes continuing to ramp down the speed of the output gear. If the speed of the output gear at 634 is the crankshaft speed, method 600 proceeds to 636.

At 636, method 600 includes switching the electric machine to the generator mode, where the electric machine no longer applies torque to the drive belt, and a propulsion of the drive belt is maintained by the one-way clutch. At 638, method 600 includes operating the electric machine as the lower efficiency generator, where electricity is generated by the electric machine via a pulley around which the drive belt is routed and stored in the one or more batteries of the vehicle described above. Operating the electric machine as the lower efficiency generator includes operating in the first operational mode described with respect to FIG. 5A. Following 638, method 600 may end. In this way, responsive to the electrical demand being less than the threshold electrical demand, the electromagnetic clutch of the TSAD is disengaged (or maintained disengaged) to drive the electric machine at the speed of the engine, thus providing adequate electrical generation without overcharging the one or more batteries, for example.

Figure 7:
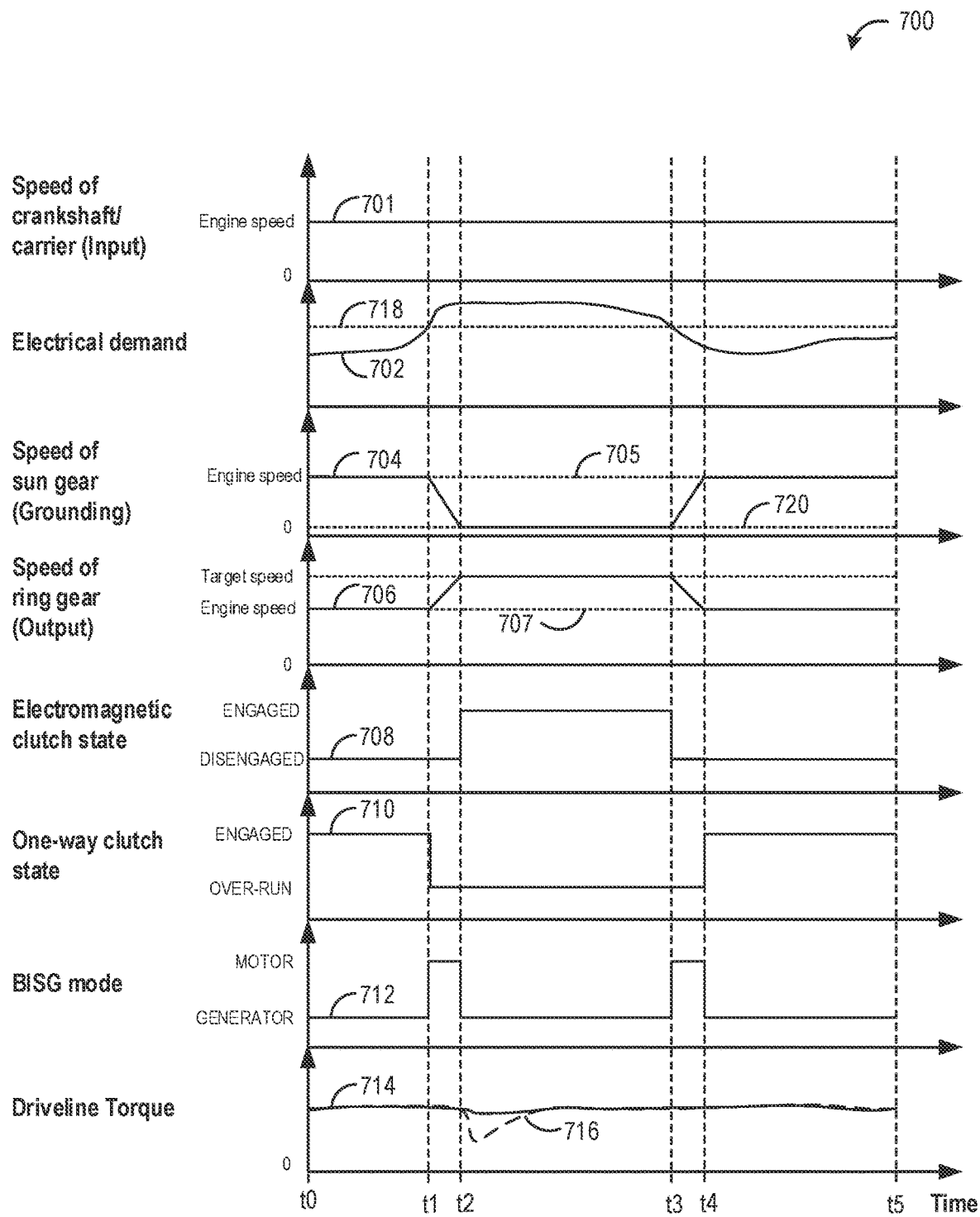
FIG. 7 shows a timing diagram indicating a state of different components of a FEAD drive system at different points in time as the electromagnetic clutch is engaged and disengaged.

Referring now to FIG. 7, a timing diagram 700 is shown indicating a state of different components of a TSAD system of a vehicle at different points in time, during which an electromagnetic clutch is engaged and disengaged as gears of the TSAD are activated. The TSAD system may be coupled to an engine of a hybrid vehicle, such as the hybrid vehicle 100 of FIG. 1, and the TSAD system may be the same as or similar to the TSAD system 400 of FIG. 4, where the TSAD system drives a drive belt to power one or more FEADs of the vehicle. Instructions for performing the actions described in timing diagram 700 may be executed by a controller (e.g., the controller 12 of FIG. 1) based on instructions stored on a memory of the controller and in conjunction with signals received from sensors of the vehicle propulsion system, such as the sensors described above in relation to the hybrid vehicle 100 of FIG. 1.

Timing diagram 700 shows plots 701, 702, 704, 706, 708, 710, 712, and 714, which illustrate states of components of the TSAD system over time. Plots 701, 704, and 706 show speeds of different gears of a planetary gear set of the TSAD system. Plot 701 indicates a speed of a carrier of the planetary gear set to which a plurality of planet gears are coupled (e.g., the carrier 406 of the TSAD 400 of FIG. 4), which acts as an input gear the TSAD system. The carrier is coupled to a crankshaft of an engine of the vehicle, and therefore the carrier speed is also the engine speed. Plot 702 shows an electrical demand of devices using electrical power generated by the vehicle, including the electrical demands of one or more front-end accessory devices (e.g., an alternator, A/C compressor, water pump, etc.). Plot 704 indicates a speed of a sun gear of the planetary gear set (e.g., the sun gear 424 of the TSAD 400 of FIG. 4), which is the grounding gear of the planetary gear set. Additionally, a dotted line 705 of plot 704 shows an engine speed (e.g., from 701) for reference purposes. Plot 706 indicates a speed of a ring gear of the planetary gear set (e.g., the ring gear 434 of the TSAD 400 of FIG. 4), which is the output gear of the planetary gear set. Additionally, the dotted line 707 of plot 706 shows the engine speed for reference purposes. In plots 701, 704, and 706, the speeds of the carrier, sun gear, and ring gear increase up the vertical axis from 0. Further, a target speed is shown on plot 706, where the target speed is a speed corresponding to a desired rotation of the output gear (e.g., the ring gear) of the planetary gear set. Plot 708 shows a state of the electromagnetic clutch, which may be ENGAGED or DISENGAGED. Plot 710 shows a state of a one-way clutch, which may be ENGAGED or OVER-RUN. Plot 712 shows a mode of functioning of the BISG, which may be MOTOR (e.g., when the BISG is using electrical energy to propel the crankshaft) or GENERATOR (e.g., when the BISG is generating electrical energy from a rotation of the crankshaft to be stored in a battery (e.g., the battery 54 of hybrid vehicle 100 of FIG. 1). Plot 714 shows a typical torque of a driveline of the vehicle, where a driveline torque disturbance is shown as a deviation from the typical torque of the driveline.

Plots 701, 702, 704, 706, 708, 710, 712, and 714 illustrate states of the above mentioned components with respect to time (horizontal axis), with time points of interest illustrated by vertical dashed lines.

At time t0, an electrical demand (plot 702) is less than a threshold electrical demand indicated by a dashed line 718. As a result, the vehicle is operated in a first operational mode. The carrier, the sun gear, and the ring gear are all rotating at the engine speed, as shown by plots 701, 704, at 706. The electromagnetic clutch is in a DISENGAGED state, as shown by plot 708, and the one-way clutch is in an ENGAGED state, as shown by plot 710. As a result of the one-way clutch being in an ENGAGED state, the ring gear (e.g., the output gear) is rotated by the one-way clutch. The BISG is functioning as a GENERATOR, as shown by plot 712. Because the vehicle is operating in the first operational mode, the BISG provides lower efficiency, base level electrical generation. Over the first duration from t0 to t1, the vehicle is in operation and is powered by the engine. A speed of the ring gear (e.g., the output gear) is equal to the engine speed, as shown by plot 706, which determines a speed of the drive belt used to power the FEADs.

At time t1, the electrical demand (plot 702) increases above the threshold electrical demand (dashed line 718). In response to the electrical demand increasing above the threshold electrical demand, the state of the BISG switches from GENERATOR mode to MOTOR mode, as shown by plot 712, and the BISG starts to speed up a rotation of the ring gear (shown by plot 706) by applying a torque to the drive belt. When the speed of the ring gear increases above engine speed at time t1, the one-way clutch is over-run, as shown by plot 710. Between time t1 and t2, the BISG ramps up the speed of the ring gear to the target speed, causing a speed of the sun gear to decrease to a clutch engagement threshold speed (e.g., zero or close to zero) indicated by a dashed line 720, as shown by plot 704, while the carrier speed is held constant at the crankshaft/engine speed, as indicated by plot 701. As the BISG increases the speed of the drive belt, more power is supplied to the FEADs to meet the higher electrical demand shown by plot 702.

At time t2, the ring gear is at target speed (e.g., a speed at which the electrical demand of the FEADs is satisfied), and the speed of the sun gear is at or below the clutch engagement threshold speed shown by dashed line 720 (e.g., 0 RPM). In response to the sun gear being at or below the threshold speed, the electromagnetic clutch is engaged at time t2, as shown by plot 708. When the electromagnetic clutch is engaged, a little or no disturbance in driveline torque is generated as the ring gear transitions from being powered by the one-way clutch to being powered by the planetary gear set, as shown by plot 714. As an example, line 716 shows a disturbance in driveline torque in an alternative situation, where the electromagnetic clutch is engaged without reducing the sun gear to the threshold speed (dashed line 720). After engagement of the electromagnetic clutch, the drive belt is maintained at the target speed by the gears of the planetary gear set rather than the one-way clutch, and therefore the BISG is switched from MOTOR mode to GENERATOR mode, as indicated by plot 712.

Between time t2 and t3, the one-way clutch remains in an over-run state, as shown by plot 710, and the vehicle continues in operation with the drive belt operating at a higher speed (e.g., the speed of the ring gear) than the engine speed as a result of the configuration of gears of the planetary gear set.

At time t3, the electrical demand (plot 702) decreases below the threshold electrical demand (dashed line 718). In response, at time t3, the electromagnetic clutch is disengaged, as shown by plot 708, and the BISG switches from GENERATOR mode to MOTOR mode (plot 712) to apply torque in an opposite direction of a motion of the drive belt to decrease the speed of the ring (output) gear, as shown by plot 706. At time t4, the speed of the ring gear decreases to the engine speed, and the speed of the sun gear correspondingly increases to the engine speed, which is equal to the carrier speed. As a result, the carrier, ring gear, and sun gear are all rotating at the engine speed at time t4, and the one-way clutch engages (plot 710). As such, the one-way clutch begins to drive the drive belt at engine speed (e.g., a 1:1 ratio). Further, because the speed of the sun gear and the speed of the ring gear have reached the engine speed, the BISG switches from MOTOR mode to GENERATOR mode, as shown by plot 712. Between time t4 and t5, the vehicle continues in operation with the drive belt being driven by the engine at a 1:1 ratio, and the BISG provides lower efficiency electrical generation to meet the lower than threshold electrical demand (plot 702).

Thus, a method for engaging and disengaging an electromagnetic clutch of a TSAD of a vehicle is provided, whereby a speed of a grounding gear of a planetary gear set of the TSAD is reduced to a clutch engagement threshold speed prior to engaging or disengaging the electromagnetic clutch. The speed of the grounding gear may be reduced by switching an electric machine such as a BISG from a generator mode to a motor mode to ramp up a speed of a drive belt of the vehicle, which increases a speed of an output gear of the planetary gear set. By maintaining a speed of an input gear of the planetary gear set at an engine speed, the increase in the speed of the output gear causes the speed of the grounding gear to decrease. When disengaging the electromagnetic clutch, the speed of the output gear may be similarly reduced by using the BISG to apply a torque in an opposite direction of the drive belt, until the speed of the output gear matches the engine speed. When the output gear is rotating at the engine speed, a one-way clutch of the TSAD is no longer over-run, and the output gear and the drive belt are powered by the engaged one-way clutch. When the output gear and the drive belt are powered by the one-way clutch, the BISG returns to a generator mode. By engaging the electromagnetic clutch when the speed of the grounding gear is at the clutch engagement threshold speed, and engaging the one-way clutch to drive the drive belt after disengaging the electromagnetic clutch, driveline torque disturbances may be reduced and an amount of NVH may be decreased. In this way, a performance of the vehicle may be increased, and a smoothness of a driving experience of the driver may be increased. Additionally, a wear of one or more components of the TSAD and/or the electromagnetic clutch may be reduced, thereby reducing a frequency of replacement of the one or more components of the TSAD and lowering an overall cost of the TSAD.

The technical effect of using an electric machine to increase a speed of an output gear of a TSAD prior to engaging an electromagnetic clutch, and to decrease the speed of the output gear after disengaging the electromagnetic clutch, is that driveline torque disturbances may be reduced and an amount of NVH may be decreased.

The disclosure also provides support for a method for a vehicle, comprising, responsive to an electrical demand being higher than a threshold electrical demand, operating an electric machine of the vehicle in a motor mode to reduce a first speed of a grounding gear of a planetary gear set of a two-speed accessory drive (TSAD) of the vehicle, and engaging an electromagnetic clutch responsive to the first speed of the grounding gear reaching a clutch engagement threshold speed. In a first example of the method, the electric machine is a belt-integrated starter generator (BISG) coupled to a drive belt of the TSAD. In a second example of the method, optionally including the first example, operating the electric machine in the motor mode to reduce the first speed of the grounding gear includes increasing a second speed of an output gear of the planetary gear set via the electric machine, while maintaining a third speed of an input gear of the planetary gear set constant. In a third example of the method, optionally including the first and second examples, increasing the second speed of the output gear via the electric machine comprises increasing the second speed of the output gear to a target speed, the target speed greater than an engine speed of the vehicle and based on a gear ratio of the planetary gear set. In a fourth example of the method, optionally including the first through third examples, the gear ratio is 1.6:1. In a fifth example of the method, optionally including the first through fourth examples, increasing the second speed of the output gear via the electric machine further comprises increasing a speed of a drive belt of the TSAD, the drive belt coupled to the output gear. In a sixth example of the method, optionally including the first through fifth examples, the planetary gear set includes a ring gear, a sun gear, and a plurality of planet gears coupled to a carrier, where the ring gear is the output gear, the carrier acts as the input gear, and the sun gear is the grounding gear, and where the ring gear functions as a pulley coupled to a drive belt of the TSAD. In a seventh example of the method, optionally including the first through sixth examples, the method further comprises disengaging the electromagnetic clutch responsive to the electrical demand decreasing below the threshold electrical demand and operating the electric machine in the motor mode, and increasing the first speed of the grounding gear of the planetary gear set of the TSAD via the electric machine in the motor mode after disengaging the electromagnetic clutch. In an eighth example of the method, optionally including the first through seventh examples, the method further comprises driving the output gear via a one-way clutch of the TSAD responsive to the first speed of the grounding gear reaching an engine speed, and switching the electric machine to the generator mode responsive to the first speed of the grounding gear reaching the engine speed.

The disclosure also provides support for a system for a vehicle, comprising an engine including a crankshaft, a two-speed accessory drive (TSAD) rotationally coupled to the crankshaft, the TSAD comprising a planetary gear set including an output gear and an electromagnetic clutch, and a controller with computer readable instructions stored on non-transitory memory that when executed during operation of the vehicle, cause the controller to, responsive to an electrical demand being higher than a threshold electrical demand, increase a speed of the output gear of the planetary gear set, and responsive to the speed of the output gear achieving a target speed, engage the electromagnetic clutch. In a first example of the system, the planetary gear set further includes an input gear and a grounding gear, and wherein the controller includes further instructions stored on the non-transitory memory that, when executed, cause the controller to maintain a speed of the input gear of the planetary gear set constant and reduce a speed of the grounding gear while increasing the speed of the output gear. In a second example of the system, optionally including the first example, increasing the speed of the output gear decreases the speed of the grounding gear below a threshold speed, and the controller includes further instructions stored in the non-transitory memory that, when executed, caused the controller to engage the electromagnetic clutch responsive to the speed of the grounding gear reaching the threshold speed. In a third example of the system, optionally including the first and second examples, the TSAD further comprises a one-way clutch coupled to the crankshaft, and wherein upon increasing the speed of the output gear above a crankshaft speed, the one-way clutch of the TSAD is over-run. In a fourth example of the system, optionally including the first through third examples, the controller includes further instructions stored in the non-transitory memory that, when executed, caused the controller to, responsive to the electrical demand decreasing below the threshold electrical demand, disengage the electromagnetic clutch, and decrease the speed of the output gear until the one-way clutch becomes engaged. In a fifth example of the system, optionally including the first through fourth examples, the system further comprises: an electric machine coupled to the output gear via a drive belt of the TSAD, and wherein the controller includes further instructions stored in the non-transitory memory that, when executed, cause the controller to operate the electric machine in a motor mode to increase the speed of the output gear via the drive belt responsive to the electrical demand being higher than the threshold electrical demand, and operate the electric machine in the motor mode to decrease the speed of the output gear via the drive belt responsive to the electrical demand decreasing below than the threshold electrical demand.

The disclosure also provides support for a method for a two-speed accessory drive (TSAD) of a vehicle, comprising, in a first condition, increasing a speed of an output gear of a planetary gear set of the TSAD to reduce a speed of a grounding gear of the planetary gear set, and in a second condition, decreasing the speed of the output gear of the planetary gear set to increase the speed of the grounding gear. In a first example of the method, the first condition is met when an engine speed of the vehicle is reduced when shifting into an overdrive gear of a transmission of the vehicle, and the second condition is met when the engine speed is increased when shifting out of the overdrive gear. In a second example of the method, optionally including the first example, the method further comprises, in the first condition, an electric machine of the TSAD overruns a one-way clutch of the TSAD, and in the second condition, the electric machine does not overrun the one-way clutch of the TSAD. In a third example of the method, optionally including each of the first and second examples, the method further comprises, in the first condition, engaging an electromagnetic clutch to couple the grounding gear after reducing the speed of the grounding gear to a clutch engagement threshold speed, and in the second condition, disengaging the electromagnetic clutch before increasing the speed of the grounding gear to the engine speed. In a fourth example of the method, optionally including the first through the third examples, increasing the speed of the output gear of the planetary gear set comprises operating the electric machine to apply a first torque to a drive belt coupling the electric machine and the output gear, and decreasing the speed of the output gear of the planetary gear set comprises operating the electric machine to apply a second torque to the drive belt coupling the electric machine and the output gear. In a fifth example of the method, optionally including the first through the fourth examples, the method further comprises, in the first condition, engaging an electromagnetic clutch to couple the grounding gear after reducing the speed of the grounding gear to a clutch engagement threshold speed; and in the second condition, disengaging the electromagnetic clutch before increasing the speed of the grounding gear to the engine speed. In a sixth example of the method, optionally including the first through fifth examples, engaging the electromagnetic clutch transmits torque from an engine crankshaft to the output gear via a planetary gear set, and wherein disengaging the electromagnetic clutch transmits torque from the engine crankshaft to the output gear via a one-way clutch.

Note that the example control and estimation routines included herein can be used with various engine and/or vehicle system configurations. The control methods and routines disclosed herein may be stored as executable instructions in non-transitory memory. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a vehicle, comprising:
responsive to an electrical demand being higher than a threshold electrical demand, operating an electric machine of the vehicle in a motor mode to reduce a first speed of a grounding gear of a planetary gear set of a two-speed accessory drive (TSAD) of the vehicle; and
engaging an electromagnetic clutch responsive to the first speed of the grounding gear reaching a clutch engagement threshold speed.

2. The method of claim 1, wherein the electric machine is a belt-integrated starter generator (BISG) coupled to a drive belt of the TSAD.

3. The method of claim 1, wherein operating the electric machine in the motor mode to reduce the first speed of the grounding gear includes increasing a second speed of an output gear of the planetary gear set via the electric machine, while maintaining a third speed of an input gear of the planetary gear set constant.

4. The method of claim 3, wherein increasing the second speed of the output gear via the electric machine comprises increasing the second speed of the output gear to a target speed, the target speed greater than an engine speed of the vehicle and based on a gear ratio of the planetary gear set.

5. The method of claim 4, wherein the gear ratio is 1.6:1.

6. The method of claim 3, wherein increasing the second speed of the output gear via the electric machine further comprises increasing a speed of a drive belt of the TSAD, the drive belt coupled to the output gear.

7. The method of claim 6, wherein the planetary gear set includes a ring gear, a sun gear, and a plurality of planet gears coupled to a carrier, where the ring gear is the output gear, the carrier acts as the input gear, and the sun gear is the grounding gear, and where the ring gear functions as a pulley coupled to a drive belt of the TSAD.

8. The method of claim 1, further comprising:
disengaging the electromagnetic clutch responsive to the electrical demand decreasing below the threshold electrical demand and operating the electric machine in the motor mode; and
increasing the first speed of the grounding gear of the planetary gear set of the TSAD via the electric machine in the motor mode after disengaging the electromagnetic clutch.

9. The method of claim 8, further comprising:
driving the output gear via a one-way clutch of the TSAD responsive to the first speed of the grounding gear reaching an engine speed; and
switching the electric machine to the generator mode responsive to the first speed of the grounding gear reaching the engine speed.

10. A system for a vehicle, comprising:
an engine including a crankshaft;
a two-speed accessory drive (TSAD) rotationally coupled to the crankshaft, the TSAD comprising a planetary gear set including an output gear and an electromagnetic clutch; and
a controller with computer readable instructions stored on non-transitory memory that when executed during operation of the vehicle, cause the controller to:
responsive to an electrical demand being higher than a threshold electrical demand, increase a speed of the output gear of the planetary gear set; and
responsive to the speed of the output gear achieving a target speed, engage the electromagnetic clutch,
wherein the planetary gear set further includes an input gear and a grounding gear, and wherein the controller includes further instructions stored on the non-transitory memory that, when executed, cause the controller to:
maintain a speed of the input gear of the planetary gear set constant and reduce a speed of the grounding gear while increasing the speed of the output gear.

11. The system of claim 10, wherein increasing the speed of the output gear decreases the speed of the grounding gear below a threshold speed, and the controller includes further instructions stored in the non-transitory memory that, when executed, caused the controller to:
engage the electromagnetic clutch responsive to the speed of the grounding gear reaching the threshold speed.

12. The system of claim 11, wherein the TSAD further comprises a one-way clutch coupled to the crankshaft, and wherein upon increasing the speed of the output gear above a crankshaft speed, the one-way clutch of the TSAD is over-run.

13. The system of claim 12, wherein the controller includes further instructions stored in the non-transitory memory that, when executed, caused the controller to:
responsive to the electrical demand decreasing below the threshold electrical demand,
disengage the electromagnetic clutch; and
decrease the speed of the output gear until the one-way clutch becomes engaged.

14. The system of claim 13, further comprising an electric machine coupled to the output gear via a drive belt of the TSAD, and wherein the controller includes further instructions stored in the non-transitory memory that, when executed, cause the controller to:
operate the electric machine in a motor mode to increase the speed of the output gear via the drive belt responsive to the electrical demand being higher than the threshold electrical demand; and
operate the electric machine in the motor mode to decrease the speed of the output gear via the drive belt responsive to the electrical demand decreasing below than the threshold electrical demand.

15. A method for a two-speed accessory drive (TSAD) of a vehicle, comprising:
in a first condition, increasing a speed of an output gear of a planetary gear set of the TSAD to reduce a speed of a grounding gear of the planetary gear set;
in a second condition, decreasing the speed of the output gear of the planetary gear set to increase the speed of the grounding gear,
wherein increasing the speed of the output gear of the planetary gear set comprises operating an electric machine to apply a first torque to a drive belt coupling the electric machine and the output gear, and wherein decreasing the speed of the output gear of the planetary gear set comprises operating the electric machine to apply a second torque to the drive belt coupling the electric machine and the output gear; and
in the first condition, engaging an electromagnetic clutch to couple the grounding gear after reducing the speed of the grounding gear to a clutch engagement threshold speed; and
in the second condition, disengaging the electromagnetic clutch before increasing the speed of the grounding gear to the engine speed.

16. The method of claim 15, wherein engaging the electromagnetic clutch transmits torque from an engine crankshaft to the output gear via a planetary gear set, and wherein disengaging the electromagnetic clutch transmits torque from the engine crankshaft to the output gear via a one-way clutch.

* * * * *